(12) United States Patent
Sakai et al.

(10) Patent No.: US 11,849,189 B2
(45) Date of Patent: Dec. 19, 2023

(54) VIDEO DISTRIBUTION SYSTEM, STORAGE MEDIUM USED THEREFOR, AND CONTROL METHOD

(71) Applicant: Konami Digital Entertainment Co., Ltd., Tokyo (JP)

(72) Inventors: Akira Sakai, Tokyo (JP); Shigeru Chiba, Tokyo (JP); Kai Inoue, Tokyo (JP); Junki Hirai, Tokyo (JP); Tsuguo Shinpo, Tokyo (JP); Toshiaki Kanahara, Tokyo (JP); Yoshihiko Narita, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 17/940,397

(22) Filed: Sep. 8, 2022

(65) Prior Publication Data
US 2023/0007353 A1     Jan. 5, 2023

Related U.S. Application Data

(63) Continuation of application No. PCT/JP2021/007972, filed on Mar. 2, 2021.

(30) Foreign Application Priority Data

Mar. 13, 2020 (JP) ................. 2020-044558

(51) Int. Cl.
*H04N 21/4784* (2011.01)
*H04N 21/2187* (2011.01)
(Continued)

(52) U.S. Cl.
CPC ..... *H04N 21/4784* (2013.01); *H04N 21/2187* (2013.01); *H04N 21/2407* (2013.01); *H04N 21/81* (2013.01)

(58) Field of Classification Search
CPC .......... H04N 21/4784; H04N 21/2187; H04N 21/2407; H04N 21/81
See application file for complete search history.

(56) References Cited

U.S. PATENT DOCUMENTS

2016/0184708 A1* 6/2016 Ziaja ................. H04N 21/2407
463/31

FOREIGN PATENT DOCUMENTS

| JP | 5381083 B2 | 1/2014 |
|---|---|---|
| JP | 2017-174134 A | 9/2017 |
| JP | 6430059 B1 | 11/2018 |

OTHER PUBLICATIONS

International Search Report dated Jun. 1, 2021 issued by the International Searching Authority in Application No. PCT/JP2021/007972.

(Continued)

*Primary Examiner* — Nicholas T Corbo
(74) *Attorney, Agent, or Firm* — Sughrue Mion, PLLC

(57) ABSTRACT

Provided is a video distribution system with which it is possible to improve the motivation of participants with respect to an event that is distributed as a recorded video. A video distribution system is connected via a network to user terminal devices, and distributes a recorded video obtained by recording status of a game event in which a plurality of participants participating therein, to the user terminal devices. And the video distribution system increases the prize money amount set for the game event according to selection of an amount increase option executed by each user via the user terminal device so as to be associated with the recorded video, and decides the individual prize money amount to be awarded to a target participant P based on the prize money amount at the end of a predetermined period.

14 Claims, 13 Drawing Sheets

(51) Int. Cl.
  *H04N 21/24*   (2011.01)
  *H04N 21/81*   (2011.01)

(56) References Cited

OTHER PUBLICATIONS

Written Opinion dated Jun. 1, 2021 issued by the International Searching Authority in Application No. PCT/JP2021/007972.
Office Action dated May 25, 2021 in Japanese Application No. 2020-044558.
Office Action dated Jan. 31, 2022 in Japanese Application No. 2020-044558.

* cited by examiner

VIDEO DISTRIBUTION SYSTEM, STORAGE MEDIUM USED THEREFOR, AND CONTROL METHOD

TECHNICAL FIELD

The present invention relates to a video distribution system and the like that is connected via a network to a user terminal device used by each user and distributes to the user terminal device a recorded video as a video obtained by recording the state of an event having a plurality of participants participating therein.

BACKGROUND ART

There exists a video distribution system that is connected via a network to a user terminal device used by each user and distributes to the user terminal device a recorded video as a video obtained by recording the state of an event having a plurality of participants participating therein. For example, a server that distributes content, such as live broadcast footage, as the recorded video is known (for example, see Patent Literature 1). Additionally, Patent Literature 2 and 3 exist as prior art documents relating to the present invention.

PRIOR ART DOCUMENTS

Patent Literature

Patent Literature 1: JP6430059B
Patent Literature 2: JP5381083B
Patent Literature 3: JP2017-174134A

SUMMARY OF INVENTION

Technical Problem

In the server of Patent Literature 1, when a spectator of live broadcast footage selects an item and pays a consideration, the selected item may be displayed superposed over the live broadcast footage, and a portion of the consideration may also be returned to the distributor of the live broadcast footage. However, even if a portion of the consideration is returned, the return destination is only the distributor and not the performer of the live broadcast footage. Although it is not uncommon for the distributor to be the performer of a live broadcast footage, this is simply a coincidence in the end, and when the performer and the distributor are different, compensation is not returned to the performer, and the return is left to the discretion of the distributor. Furthermore, Patent Literature 2 discloses a content evaluation system that applies a ranking to all content according to an evaluation point and allocates profit according to the evaluation point to creators of content of a predetermined ranking or higher. However, in this system as well, the object to which profit according to the evaluation point is allocated, that is, the return destination of the profit, is merely the creator of the content and not the performance or the like of the content. As a result, it is not possible to give sufficient incentive (motivation) for the performer of the content to enliven the content thereof.

On the other hand, Patent Literature 3 discloses a server device that acquires input information including information of a monetary offering for an athlete given by a spectator watching a match including the athlete, and provides this information externally. However, a monetary offering for individual athletes is merely realized, and the server device does not have a structure where prize money set per match, in other words, prize money to be allocated to all athletes or a portion of the athletes, is increased. For this reason, while it may be possible to increase the motivation of each athlete, spectators are unable to support each athlete on a match basis.

Therefore, an object of the present invention is to provide a video distribution system and the like that can improve the motivation of a participant in an event during the event distributed as a recorded video.

Solution to Problem

A video distribution system according to the present invention is a video distribution system comprising a computer that is connected via a network to a user terminal device used by each user and is for distributing to the user terminal device a recorded video as a video obtained by recording state of an event having a plurality of participants participating therein, wherein the computer serves as: a data storage unit that stores prize money data described so that the recorded video and an event prize money amount as prize money set for the event are associated with each other; a prize money increase unit that increases the event prize money amount according to a donation action executed by each user via the user terminal device so as to be associated with the recorded video; and a prize money decision unit that decides an individual prize money amount as prize money to be awarded to at least a portion of participants of the plurality of participants based on the event prize money amount at the end of a predetermined period.

On the other hand, a non-transitory computer readable storage medium of the present invention is a non-transitory computer readable storage medium storing a computer program that is configured to cause a computer connected via the network to the user terminal device to function as each unit of the video distribution system.

Furthermore, a control method according to the present invention is a control method for causing a computer which is incorporated into a video distribution system connected via a network to a user terminal device used by each user, distributing to the user terminal device a recorded video as a video obtained by recording state of an event having a plurality of participants participating therein, and comprising a data storage unit for storing prize money data described so that the recorded video and an event prize money amount as prize money set for the event are associated with each other, wherein the control method for controlling the computer comprises: a prize money increase step that increases the event prize money amount according to a donation action executed by each user via the user terminal device so as to be associated with the recorded video; and a prize money decision step that decides an individual prize money amount as prize money to be awarded to at least a portion of participants of the plurality of participants based on the event prize money amount at the end of a predetermined period.

DESCRIPTION OF EMBODIMENTS

One example of a video distribution system according to the first embodiment of the present invention will be described below. First, an overall configuration of a video system according to the first embodiment of the present invention will be described with reference to FIG. 1. A video distribution system 1 includes a center server 2 as a server device and a camera 3 connected to the center server 2 via a prescribed network NT. The center server 2 is constituted as one logical server device by a combination of server units 2A, 2B . . . as a plurality of computer devices. However, the center server 2 may be constituted by a single server unit. Alternatively, the center server 2 may be logically constituted using cloud computing.

The network NT may be configured as appropriate, as long as the camera 3 (or a game machine GM or the like described below) is able to be connected to the center server 2. As one example, the network NT may be constructed by the internet as a WAN and a LAN connecting both the center server 2 and the camera 3 to the internet. Incidentally, various types of computer devices, such as a local server for controlling the camera 3, may be interposed, as appropriate, between the camera 3 and the LAN. In this case, the computer device and the camera 3 are constructed as one event system, and the event system may be connected to the center server 2 via the network NT.

Figure 1:
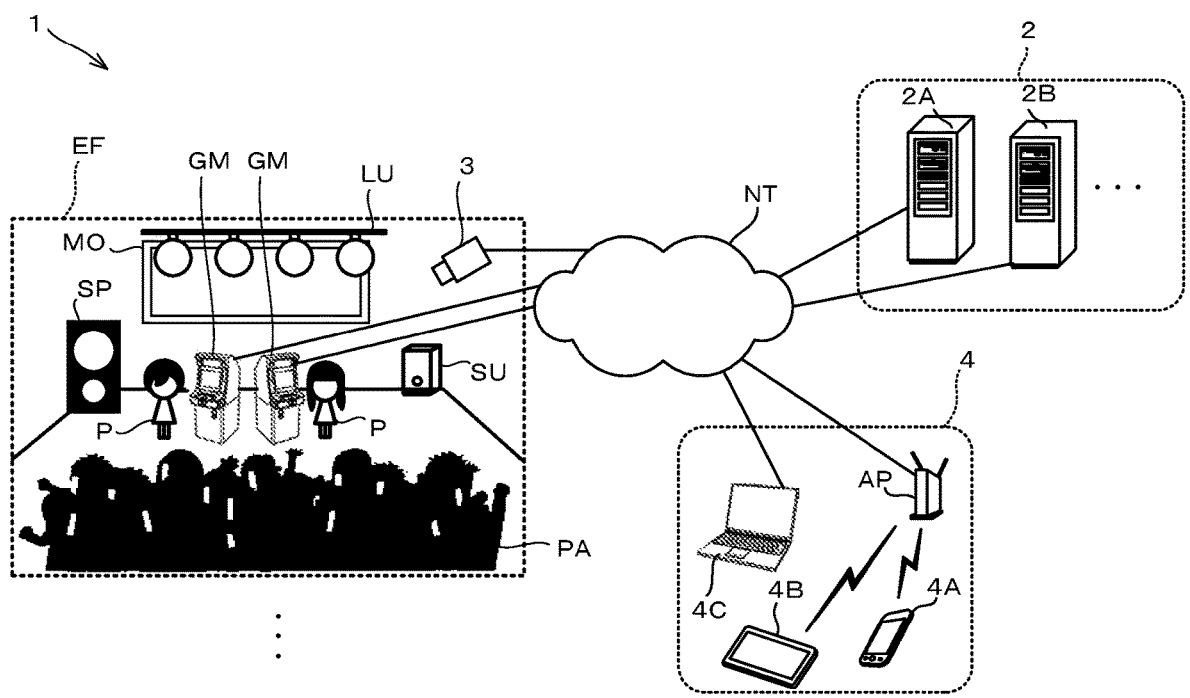
FIG. 1 is a diagram illustrating a schematic configuration of a video distribution system according to a first embodiment of the present invention.

The camera 3 is a well-known device that films video. The camera 3 may be configured as appropriate, as long as it is possible to provide the filmed result to the center server 2, and, as one example, is configured as network equipment that is connectable to the network NT, and its operation is controlled by the center server 2 via the network NT. Furthermore, the camera 3 may be installed so as to film an appropriate object in an appropriate location, and, in the example in FIG. 1, is installed at an event site EF so as to film the state of an event being held thereat. Furthermore, one camera 3 is illustrated in the example in FIG. 1, but an appropriate number of cameras 3 may be installed at the event site EF.

The event site EF is the site where an event is held. There may be one event site EF, but in the example in FIG. 1, a plurality of event sites EF (including the case where one event site EF functions as a plurality of event sites EF by time difference) is prepared. One event (including both simultaneous hosting and hosting having a time difference) may be provided at a plurality of event sites EF, and a plurality of events may be provided. In this manner, appropriate events may be provided as appropriate at each event site EF, but in the example in FIG. 1, an event using a game provided by a game machine GM (hereinafter sometimes referred to as a game event) is held at at least one event site EF. Below, as one example, a case is described wherein the camera 3 films a game event at the event site EF.

The game machine GM is a device that provides a game. Each game machine GM may be configured as an independent type of device, and when an event system is constructed, the game machine GM may be connected to the event system and provide various types of information such as game results to the event system. In this manner, each game machine GM may be configured as appropriate, and, as one example, is connected to the center server 2 via the network NT, providing to the center server 2, as appropriate, information of various types of game states including game results (including information for replay data for reproducing a game screen) or image data obtained by capturing the game screen for video distribution or the like. Furthermore, an appropriate number of game machines GM may be installed at the event site EF, and in the example of FIG. 1, two game machines GM are installed at the event site EF. Various types of computer devices provided for individual use, such as a stationary type or portable type game machine (including a tablet or smartphone), or a stationary type or book type personal computer, may be used as each game machine GM, but in the example in FIG. 1, an arcade game machine is used. An arcade game machine is a computer device installed at an appropriate facility, such as a store, with the main purpose of allowing many users to repeatedly play a game to increase profits. Therefore, each game machine GM is configured as a commercial (business) game machine (game machine that provides a game for a fee) that allows a user to play a game, in exchange for payment of a predetermined play fee, within a range corresponding to the play fee, but in the example in FIG. 1, playing of a game is provided free of charge as one part of an event at the event site EF.

Each game machine GM may provide an appropriate game such as an action game, a simulation game, a role-playing game, a timing game (music game), or the like for an event. Furthermore, each game machine GM may provide these games in an appropriate format, such as an appropriate match type, including one-to-one, one-to-many (team), or many-to-many (the number of players may or may not be the same among the opponents), or a cooperative type (including the case where the opponent or cooperator is a computer), or the like. In either case, the game event is provided as a competition between users P (hereinafter sometimes referred to as participants P) who play each game machine GM and compete for a result. Furthermore, the game event may be held without spectators, but in the example in FIG. 1, it is held so as to include a plurality of spectators PA who watch the participants P playing. In this example, two participants P function as a plurality of participants according to the present invention.

In addition to the game machine GM, various types of devices, such as performance equipment for performing (enlivening) a game event, may be appropriately installed at the event site EF, and in the example in FIG. 1, a light unit LU, a speaker SP, a smoke device SU, and a monitor 47 are installed as varieties of performance equipment. The light unit LU is well-known illumination equipment that executes various types of visual performances using illumination (light), such as turning on, blinking, turning off, or appropriate coloring, or the like. The speaker SP is a well-known audio output device that executes auditory performances by reproducing (outputting) various types of audio. The smoke device SU is a well-known device that executes visual performances by generating an appropriate amount of smoke. Furthermore, the monitor 47 is a well-known display device that displays various types of images (including images for performances or various types of information). The monitor 47 may display the filmed result of the camera 3 as an image for the performance, for example. These various types of performance equipment may be connected to, for example, the center server 2 and controlled by the center server 2, and may be connected to and controlled by an event system when an event system is constructed at the event site EF. In this manner, each performance equipment may be controlled as appropriate.

In the video distribution system 1, the user terminal device 4 is sometimes connected via the network NT. The user terminal device 4 is a computer device that can be connected to a network and made available for the personal use of a user. The user terminal device 4 is able to allow a user enjoy various services provided by the center server 2 by installing various types of computer software. For example, the user terminal device 4 functions as a display terminal capable of displaying the filmed footage filmed by the camera 3 accompanying the execution of a predetermined application (software). An appropriate computer device may be used as the user terminal device 4, and in the example in FIG. 1, user terminal devices including a mobile terminal device 4A such as a mobile phone (including a smartphone), a mobile tablet terminal device 4B, and a book-type (may be stationary) personal computer 4C are illustrated. These are connected, as appropriate, to the network NT through, for example, an access point AP or the like. Incidentally, in addition thereto, various types of computer devices capable of connecting to a network such as, for example, a stationary type home game machine or a portable game machine and used for the individual use of the user may be utilized as the user terminal device 4.

The center server 2 provides various types of equipment services to the camera 3 and the game machine GM. The equipment services include an information acquisition service for acquiring information on the play state of each participant P from each game machine GM. Furthermore, the equipment services may include a data update service that reflects the play state information in the data when information on play performance or the like of each participant P is managed via various types of data such as play data or the like. Moreover, the equipment services include a control service for controlling the filming conditions (filming direction, filming range, angle of view, filming timing, or the like) of the camera 3 and a video recording service for acquiring the filmed result and recording it as footage data. Furthermore, when the camera (or the event system) is configured to be able to store the program or the data, the equipment service may include a data distribution service that distributes and updates the program or data via the network NT.

Similarly, the center server 2 provides various types of web services to the user of the user terminal device 4 via the network NT. The web service includes a footage distribution service for distributing a filmed video as footage corresponding to the filmed result of the camera 3, and a video-related service related to the filmed video. The footage distribution service may be configured to distribute, as appropriate, footage data corresponding to the filmed video to the user terminal device 4, and, as one example, is configured to distribute the data as needed using packet communication. That is, the filmed video is streaming-distributed as needed through the footage distribution service. Furthermore, a live video that distributes the filmed result of the camera 3 (state of the event site EF) live and a documented video as a video obtained by documenting the live video may be included, as appropriate, in the filmed video, and as one example, both of these are included.

The video-related service may include, as appropriate, various types of services related to the filmed video, and as one example, a sponsor service is included. The sponsor service is a service for allowing a viewer of filmed video to function as a sponsor (advertisers, contributors, donors, supporters, or the like) of a game event. Details of the sponsor service will be described below. Incidentally, the web service may additionally include, for example, a data distribution service that distributes various types of data or software (including updates of data or the like) to each user terminal device 4, an ID award service that awards a user ID for identifying each user, an authentication service that receives identification information of the user from the user terminal device 4 and authenticates that user, and a billing service that collects fees from each user of the user terminal device 4 through well-known settlement processing, and the like.

Next, the main components of a control system of the video distribution system 1 will be described with reference to FIG. 2. First, the center server 2 is provided with a control unit 21 and a storage part 22 as a storage unit. The control unit 21 is configured as a computer, wherein a CPU, as one example of a processor that executes various types of arithmetic processing and operation controls according to a predetermined computer program, and an internal memory and other peripheral devices necessary for the operation are combined.

The storage part 22 is an external storage device realized by a storage unit including a nonvolatile storage medium (computer readable storage medium) such as a hard disk array or the like. The storage part 22 may be configured to hold all data in one storage unit or to disperse and store data in a plurality of storage units. A program PG1 is recorded in the storage part 22 as one example of a computer program that causes the control unit 21 to execute various types of processing necessary to provide various types of services to the user. Moreover, the storage part 22 stores server data 23 necessary for providing various types of services. The server data 23 includes various types of data required to provide an equipment service or web service, and in the example in FIG. 2, video data VD, prize money data AD, and competition data ED are illustrated as varieties of the various types of data.

The video data VD are well-known footage data for causing the user terminal device 4 to display filmed video (footage) of the camera 3. The video data VD are generated based on the filmed result of the camera 3. The prize money data AD are data for managing prize money set for a game event. The competition data ED are data for managing information of various types of states of game events (competitions), such as the play results of each participant P. Details of the prize money data AD and the competition data ED will be described below. Incidentally, the server data 23 may additionally include, for example, various types of data for realizing various types of services. For example, the data may include the play data described above, ID management data for managing various types of IDs such as user IDs and the like, or the like. However, illustrations of those are omitted.

The control unit 21 is provided with an equipment service management part 24 and a terminal service management part 25 as logical devices realized by the combination of hardware resources of the control unit 21 and the program PG1 as a software resource. The equipment service management part 24 executes various types of processing for realizing the foregoing equipment service with respect to the camera 3 or the game machine GM. On the other hand, the terminal service management part 25 executes various types of processing for realizing the foregoing web service with respect to the user terminal device 4. The processing includes processing for realizing a footage distribution service and a video-related service. Specifically, the terminal service management part 25 executes well-known processing to realize streaming distribution as processing for realizing the footage distribution service. Similarly, the terminal service management part 25 executes various types of processing as processing for realizing the video-related service, and the processing includes processing for realizing the sponsor service. The terminal service management part 25 executes, for example, prize money increase processing, increase cancellation processing, prize money decision processing, prize money offer processing, and privilege award processing as processing for realizing the sponsor service. Details of the procedures for the prize money increase processing, increase cancellation processing, prize money decision processing, prize money offer processing, and privilege award processing will be described below. Incidentally, an input device such as a keyboard or the like, and an output device such as a monitor or the like, or the like may be connected to the control unit 21 as necessary. However, illustrations of those are omitted.

On the other hand, the user terminal device 4 is provided with a control unit 41 as a computer and a storage part 42 as a storage unit. The control unit 41 is configured as a computer, wherein a CPU, as one example of a processor that executes various types of processing according to a predetermined computer program, and an internal memory and other peripheral devices necessary for the operation are combined.

The storage part 42 is an external storage device realized by a storage unit including a nonvolatile storage medium (computer readable storage medium) such as a hard disk or a semiconductor storage device. A program PG2 is recorded in the storage part 42 as one example of a computer program that causes the control unit 41 to execute various types of processing necessary to provide various types of services to the user. Furthermore, terminal data TD necessary for enjoying web services, such as the display of footage, are recorded in the storage part 42. Various types of data are included in the terminal data TD, and in the example in FIG. 2, video data VD and prize money data AD are illustrated as varieties thereof. The video data VD and the prize money data AD are provided from the center server 2 so as to include parts required as one portion of a footage distribution service (or data distribution service) or video-related service. Incidentally, the terminal data TD may additionally include, for example, ID management data or the like provided, as appropriate, from the center server 2. Similarly, the terminal data TD may include, for example, image data for displaying various types of images related to footage distribution or audio data for reproducing various types of audio, such as BGM, or the like. However, illustrations of these are omitted.

In the control unit 41, there are constituted various types of logical devices by combination of hardware resources of the control unit 41 and the program PG2 as a software resource. Also, various types of processing necessary for enjoying a web service are executed through these logical devices, and an image control part 43 and a data management part 44 are illustrated in the example in FIG. 2 as logical devices related thereto. The image control part 43 is a logical device that performs various types of processing for displaying various types of images (including footage). The processing includes processing for displaying filmed video (footage) (processing for enjoying the footage distribution service) and processing for displaying various types of images related to the footage for enjoying the video-related service. On the other hand, the data management part 44 is a logical device that performs various types of processing relating to management of various types of data recorded in the storage part 42. The processing includes processing for acquiring video data VD and prize money data AD from the center server 2, processing for updating these as appropriate, or processing for providing (transmitting) the updated data to the center server 2.

Figure 2:
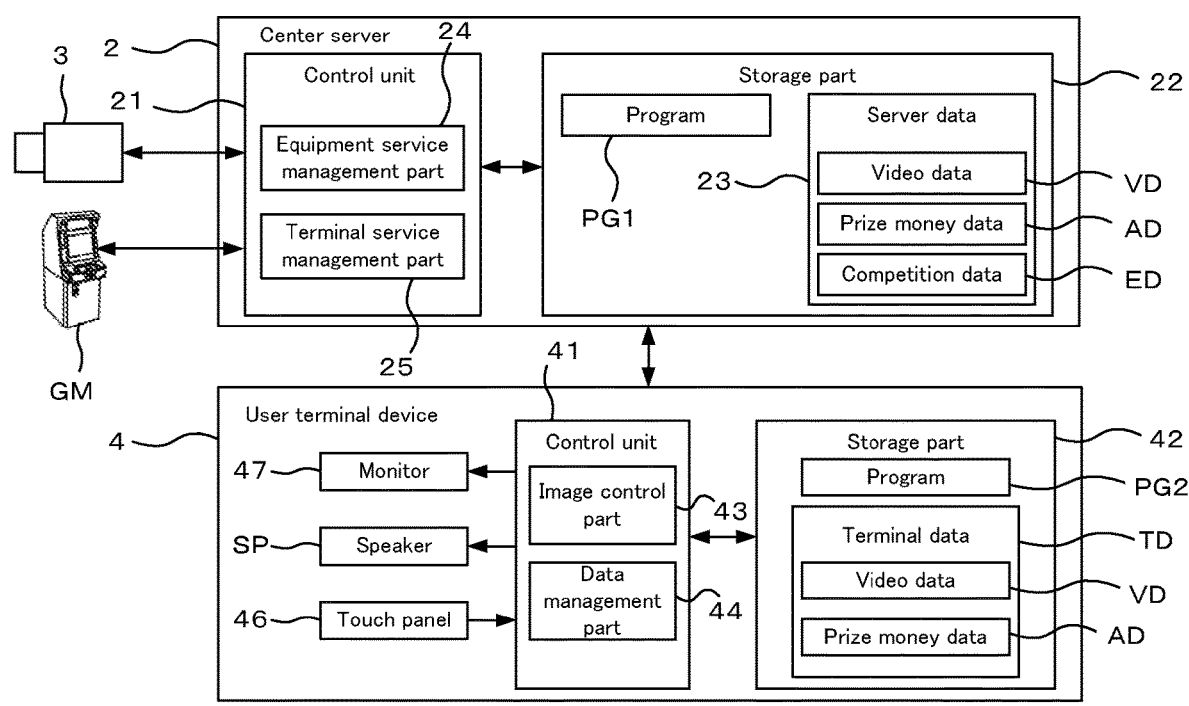
FIG. 2 is a functional block diagram illustrating the main components of a control system of the video distribution system.

Furthermore, various types of output devices and input devices may be provided, as appropriate, to a user terminal device 4 according to the type of user terminal device or the like, such as a mobile terminal device 4A, and in the example in FIG. 2, the monitor 47 and the speaker SP are illustrated as the output devices and a touch panel 46 is illustrated as an input device, respectively. The monitor 47 and the speaker SP are, respectively, a well-known display device for displaying various types of images such as footage or the like, and a well-known audio playback device for reproducing audio. Furthermore, the touch panel 46 is a well-known input device (detection device) that detects a position of a touch operation by the user and outputs a signal according to the position. Through the touch operation on the touch panel, an appropriate touch operation for using the footage distribution service or the video-related service is input to the user terminal device 4. The touch panel 46 is disposed on the monitor 47 so as to cover the monitor 47 for detecting the touch operation.

Next, the details of the sponsor service will be described with reference to FIG. 3 to FIG. 6. The sponsor service may be configured so that a viewer of filmed video is allowed to function, as appropriate, as a sponsor at a game event, and as one example, the sponsor service is configured so that a viewer is allowed to function as a sponsor for prize money set for a game event (competition). Therefore, the sponsor service is configured to provide a viewer with an opportunity to increase or decrease the prize money amount of the game event. The provision of this opportunity may be realized, as appropriate, by various types of methods including provision through audio, and as one example, this is realized through a selection screen including options for increasing or decreasing the amount. Furthermore, the selection screen may be displayed separately from the video screen that displays the filmed video through an appropriate touch operation or the like, and, for example, a video screen that also functions as the selection screen is displayed. That is, the sponsor service is configured so that the user terminal device 4 is caused to display a video screen including options, such as increasing the amount.

Figure 3:
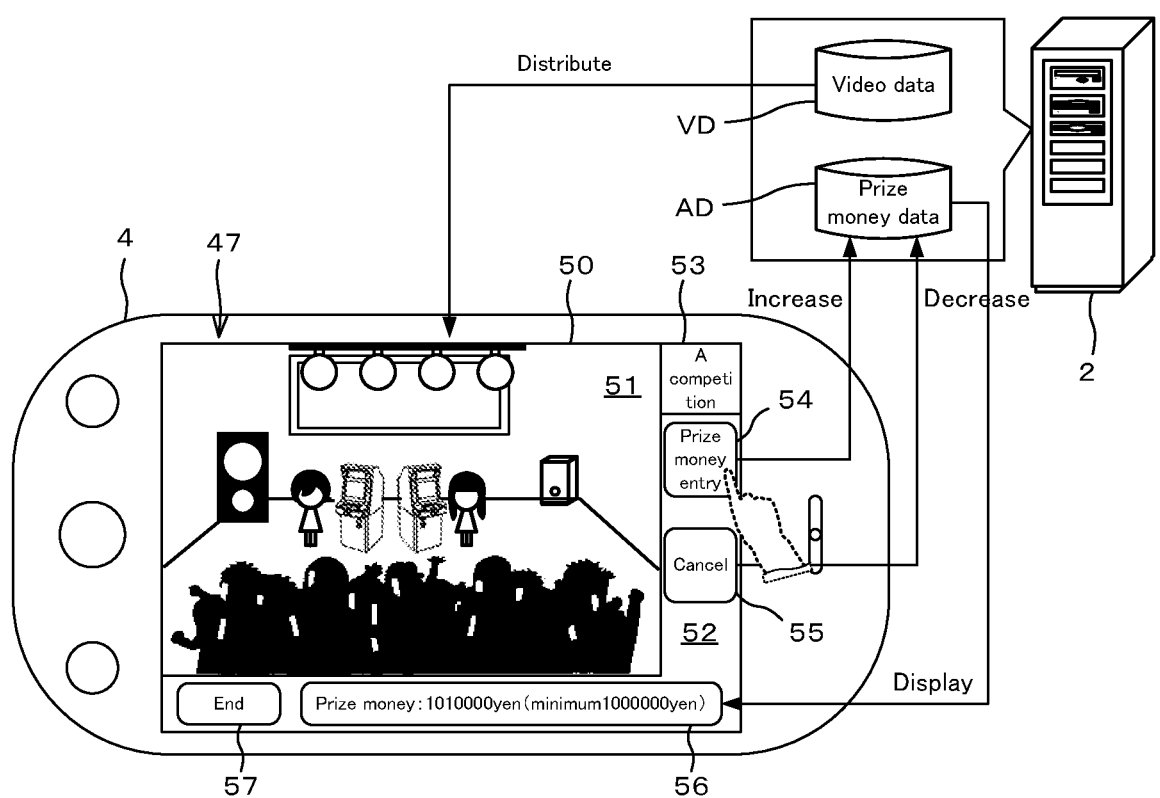
FIG. 3 is a descriptive diagram for describing a summary of a sponsor service.

FIG. 3 is a descriptive diagram for describing a summary of the sponsor service. Furthermore, the example in FIG. 3 illustrates the data used by the sponsor service and the user terminal device 4 to describe the summary, and a video screen 50 as described above is schematically displayed on the user terminal device 4. Specifically, as illustrated in FIG. 3, when the user terminal device 4 requests the filmed video, the center server 2 distributes video data VD corresponding to the filmed video to the user terminal device 4. This distribution is realized as streaming distribution that displays the filmed video on the user terminal device 4 as needed. Also, by distributing the video data VD, the video screen 50 is displayed on the monitor 47 of the user terminal device 4.

The video screen 50 includes a video region 51 and a related information region 52. The video region 51 is a region wherein the filmed video filmed by the camera 3 is displayed. That is, the filmed video based on the video data VD is displayed in the video region 51. In the video region 51, either a live video or a documented video may be displayed as the filmed video, and in the example in FIG. 3, a live video is displayed as a video of a filmed result obtained by filming the state of the event site EF in the example in FIG. 1. Furthermore, a game screen (including both a game screen captured in the game machine GM and a game screen reproduced based on replay data) may be inserted, as appropriate, (commentary and the like may be added as appropriate) in the live video (similar to the case of a documented video), but in the example in FIG. 3, the filmed result of the camera 3 is displayed in the video region 51. On the other hand, the related information region 52 is a region wherein various types of information related to the filmed video being displayed in the video region 51 are displayed. The video region 51 and the related information region 52 may be formed in appropriate sizes and shapes, and in the example in FIG. 3, the video region 51 is formed in the most visible range near the center, and within the periphery thereof, the related information region 52 is formed on the right side and below (smaller than the video region 51 and within a range that does not interfere with viewing of the filmed video).

The related information region 52 may further include an appropriate region for displaying various types of information, and in the example in FIG. 3, a name field 53, an amount increase option 54, an amount decrease option 55, a prize money offer field 56, and an end option 57 are included. The name field 53 is a region for displaying the name of the filmed video. An appropriate name may be set for the filmed video, and in the example in FIG. 3, the name ("A competition") of a competition (game event) is set as the name of the filmed video and displayed in the name field 53.

The amount increase option 54 and the amount decrease option 55 are both regions that function as options and function as virtual push buttons (regions corresponding to ranges where touch operations are to be executed) that accept touch operations in combination with the touch panel 46. Specifically, the amount increase option 54 is an option to be touch operated when the viewer increases (contributes to) the prize money amount as a sponsor. Appropriate information indicating the function of the option may be displayed in the amount increase option 54, and in the example in FIG. 3, information for a "prize money entry" is offered. When a touch operation is executed on the amount increase option 54, an input opportunity (for example, an input screen) to input an increased amount (contribution amount) may be provided separately as appropriate, and as one example, a fixed amount is increased, as appropriate, through an intermediate process such as an intention confirmation or the like accompanying a single touch operation. The intermediate process may include various types of processes (procedures) as appropriate and includes, for example, a settlement process. The settlement process may also be configured as appropriate and includes, for example, a process for settling a necessary amount increase, and a process for confirming whether the settlement is completed, and invalidating an increase as a settlement error when settlement is not complete. Furthermore, a settlement system that realizes the settlement process may be configured as one portion of the video distribution system 1 or as another system. When configured as another system, the settlement system may be operated by a similar operator as the operator of the video distribution system 1 or may be constructed as a third party system operated by another operator. Moreover, a point system that uses various types of points (appropriate electronic values) as an object of settlement may be used as the settlement system. That is, points may be charged through the appropriate settlement system first, and an increase in amount may be realized through consumption of the points (as a result, the increase in amount is limited to the amount charged) (in other words, the prize money amount may be various types of points). In this manner, an appropriate intermediate process such as a settlement process or the like may be interposed, but in any case, a one-touch operation corresponds to a single share of the increased amount of the prize money amount accompanying an increase in the fixed amount. Therefore, a viewer who cannot perform a sufficient increase by a one-touch operation is required to perform a plurality of touch operations (increase of a plurality of shares) so as to reach a desired increased amount. Then, the result of the touch operation, that is, an increase in the prize money, is reflected in the prize money data AD of the center server 2. In this example, the touch operation on the amount increase option 54 functions as a donation action according to the present invention. Furthermore, the viewer who executed the touch operation on the amount increase option 54 functions as a donation user according to the present invention.

On the other hand, the amount decrease option 55 is an option to be touch operated when the viewer decreases the prize money amount. Decreasing the prize money amount is limited to the viewer's own contribution amount (increased amount). That is, the amount decrease option 55 is used for decreasing (cancelling) the prize money amount of an increased amount portion when each viewer increases the prize money amount by the touch operation on the amount increase option 54. Furthermore, decreasing through the amount decrease option 55 may be executed without limitation as long as the contribution amount remains, and as one example, decreasing is limited to during viewing of the filmed video increased by the touch operation on the amount increase option 54. That is, when each viewer wants to reduce their own contribution portion (increased amount portion), each viewer must perform a touch operation on the amount decrease option 55 while viewing the filmed video for which the increase was performed. Furthermore, when a touch operation is executed on the amount decrease option 55, an input opportunity to input a decreased amount (contribution amount to be decreased) may be provided separately as appropriate, and as one example, a fixed amount (single share portion) is decreased, as appropriate, through an intermediate process such as an intention confirmation or the like, similar to the amount increase option 54. Then, the result of the touch operation, that is, a decrease in the prize money, is also reflected in the prize money data AD of the center server 2. In this example, the touch operation on the amount decrease option 55 functions as a cancellation action according to the present invention.

A prize money offer field 56 is a region for displaying information on a prize money amount set for a competition (game event) being viewed. The prize money amount of the competition is managed by the prize money data AD of the center server 2. Therefore, the prize money amount of the prize money data AD is displayed in the prize money offer field 56. The prize money amount of the prize money data AD may be reflected, as appropriate, in the prize money offer field 56 and, for example, is reflected on the center server 2 side, and the center server 2 may distribute to the user terminal device 4 data for displaying the video screen 50 including the prize money offer field 56 displaying the prize money amount (the same also applies to other various types of information not accompanied by a viewer operation); as one example, the prize money amount is reflected in the prize money offer field 56 on the user terminal device 4 side. More specifically, the user terminal device 4 acquires prize money data AD from the center server 2 and displays the prize money amount of the prize money data AD in the prize money offer field 56. Acquisition of the prize money data AD, in other words, the prize money amount of the prize money data AD in the prize money offer field 56, may be reflected according to an appropriate condition, such as at the start of viewing of the filmed video or at a predetermined period or the like, and as one example, acquisition is executed every time the prize money amount of the prize money data AD is updated. That is, the prize money amount based on the most recent prize money data AD is displayed in the prize money offer field 56. Furthermore, the prize money data AD may manage, as appropriate, the prize money amount, and for example, the prize money amount may be managed by distinguishing between an initial prize money amount, and an increased prize money amount as an increased portion therefrom. While the prize money amount may be displayed, as appropriate, in the prize money offer field 56, in the example in FIG. 3, "1,010,000 yen" is distinguished and displayed as an accumulated amount (sum of the initial prize money amount and the increased prize money amount), and "1,000,000 yen" is distinguished and displayed as the initial prize money amount (information indicating that the "minimum" character is the initial prize money amount). As a result, the amount of money obtained by subtracting the initial prize money amount from the accumulated amount is understood as the increased prize money amount. In this example, "1,000,000 yen" and an amount obtained by subtracting "1,000,000 yen" from "1,010,000 yen" respectively function as the initial prize money amount and the increased prize money amount according to the present invention.

The end option 57 is a region functioning as an option for ending viewing of the filmed video being viewed (being displayed in the video region 51), and functions as a virtual push button (region corresponding to a range where a touch operation is to be executed) that accepts a touch operation in combination with the touch panel 46. That is, when the touch operation is executed on the end option 57, the display of the filmed video ends. The end may be realized by non-display of the filmed video displayed in the video region 51, and as one example, the end is realized by ending the display of the video screen 50. That is, the display of the video screen 50 ends accompanying the touch operation of the end option 57. Incidentally, the video screen 50 may additionally include, as appropriate, various types of options and the like, and when, for example, documented video is displayed as the filmed video, these options may include each option for fast forwarding, rewinding, pausing, or resuming (restarting playback) playback of the documented video.

Figure 4:
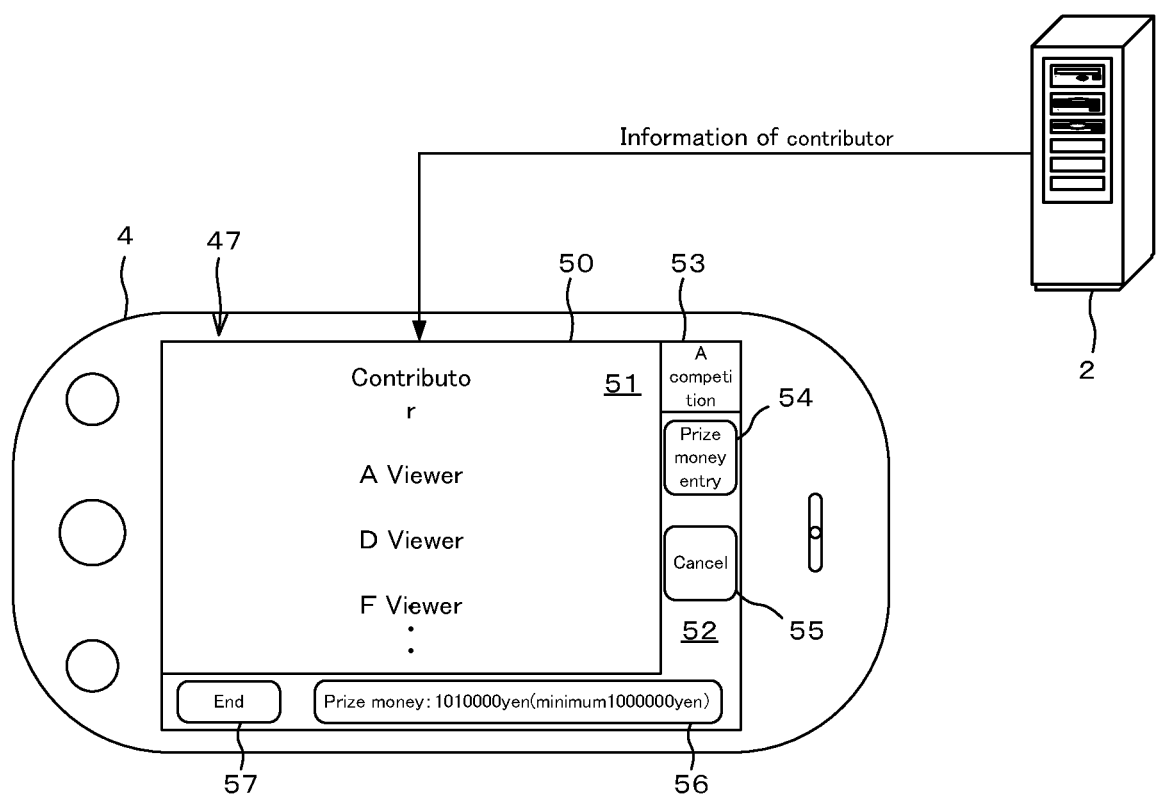
FIG. 4 is a descriptive diagram for describing privileges awarded to viewers (contributor) who increase a prize money amount.

FIG. 4 is a descriptive diagram for describing a privilege awarded to a viewer (contributor) who increases the prize money amount. The contributor (sponsor) may be awarded an appropriate tangible privilege (including an electronic object), such as being awarded various types of items related to the game, and may be awarded an appropriate intangible privilege, such as being awarded various types of performances in a game event or filmed video. Furthermore, the intangible privilege may include various types of honorary rights, such as the right to name a game event. In this manner, an appropriate privilege may be granted to a contributor, and in the example in FIG. 4, a case is illustrated where a privilege is awarded to display the name of the contributor in the filmed video as a variety of honorary right. In this case, as illustrated in FIG. 4, the names of contributors such as "A viewer", "D viewer", and the like are displayed on the filmed video. The information of a contributor (including the name) to be displayed on the filmed video is provided from the center server 2 to the user terminal device 4.

The display of a name may be awarded in a uniform manner regardless of the contribution amount (increased amount), but as one example, the display of a name is awarded only for viewers who performed an increase of a predetermined amount or greater. Furthermore, the names of the contributors may be set in a fixed manner in accordance with various types of rules, such as the names of the viewers, and as one example, the names are arbitrarily set by the contributors. That is, a name freely set by a contributor is displayed on the filmed video as the name of the contributor. The name may be displayed at an appropriate time and may be displayed, for example, so as to overlap the filmed video in the middle of the filmed video, and as one example, the name is displayed at the end of the filmed video.

Figure 5:
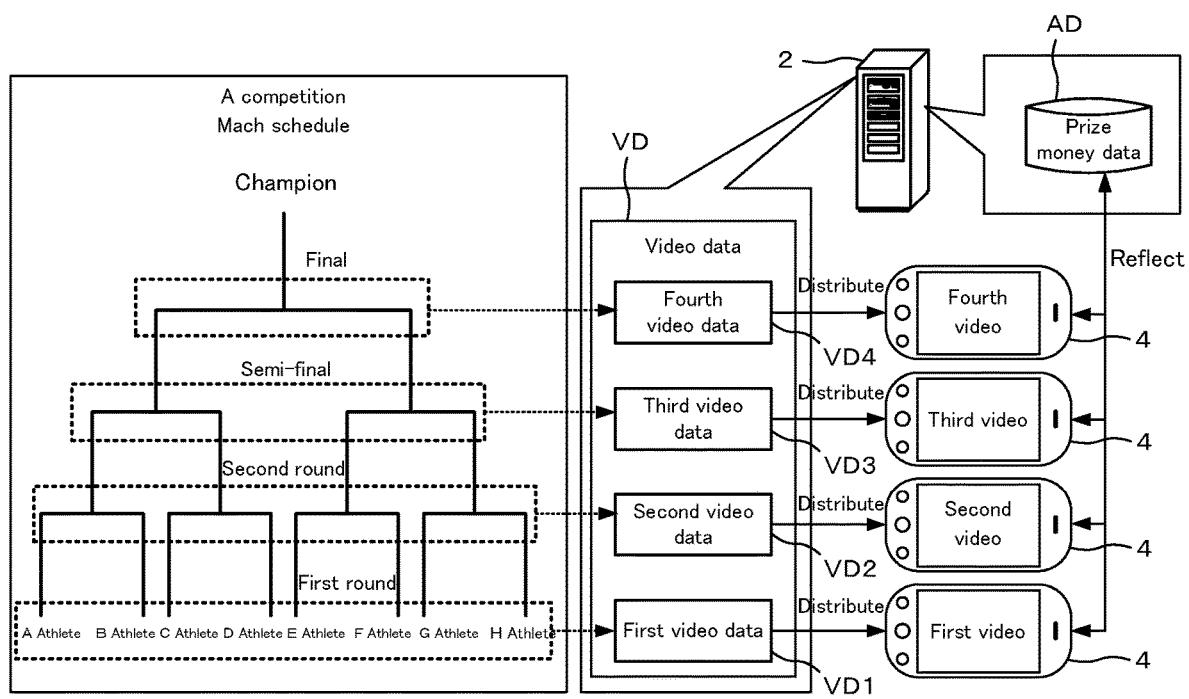
FIG. 5 is a descriptive diagram for describing a filmed video displayed by video data.

FIG. 5 is a descriptive diagram for describing a filmed video displayed by the video data VD. The game event may be filmed by one camera 3 or may be filmed by a plurality of cameras. Furthermore, when one camera 3 films the game event, the one camera 3 may film the game event from the beginning to the end, or may film a portion of the game event or a portion thereof so that a plurality of portions are picked out. Therefore, the video data VD may also be configured so as to display one filmed video corresponding to one filmed result, or may be configured so as to display a plurality of filmed videos. That is, a plurality of filmed videos may be prepared as the filmed video corresponding to one game event. The example in FIG. 5 illustrates when the video data VD is configured so as to display a plurality of filmed videos corresponding to different portions of the game event. In this case, as illustrated in FIG. 5, the video data VD includes a plurality of video data VD1 to VD4 corresponding respectively to the filmed result of a plurality of different portions of the game event. Also, accompanying the distribution of the plurality of video data VD1 to VD4, a plurality of filmed videos respectively corresponding to the plurality of video data VD1 to VD4 is displayed on the user terminal device 4.

Specifically, the game event may be realized in an appropriate format such as a league game (round-robin tournament) or the like, and in the example in FIG. 5, the event is held in a tournament format as a competition of a type wherein participants P compete for a play result. Furthermore, the tournament format may include an appropriate number of matches according to the number of participants P, and in the example in FIG. 5, four rounds are included; a first round, a second round, a semi-final, and a final. Also, the video data VD includes first video data VD1 corresponding to a filmed result obtained by filming the first round, second video data VD2 corresponding to a filmed result obtained by filming the second round, third video data VD3 corresponding to a filmed result obtained by filming the semi-final, and fourth video data VD4 corresponding to a filmed result obtained by filming the final.

Each round may be filmed, for example, so that a plurality of cameras 3 is switched as appropriate. In this case, in a round including a plurality of matches from the first round to the semi-final, one or a plurality of cameras 3 may film so as to cover the plurality of matches, or may film each match so as to focus on each match. Similar filming may be realized by one camera 3. Furthermore, in the case of documented footage, the filmed result of one or a plurality of cameras 3 (may further include an appropriate game screen) may be edited as appropriate. In this manner, the four rounds may be filmed (or edited), as appropriate, through an appropriate number of cameras 3, and as one example, one camera 3 films each round so as to cover all matches, and four video data VD1 to VD4 correspond to these filmed results.

When the first video data VD1 are distributed to the user terminal device 4, a first video corresponding to the filmed result of the first round is displayed as a filmed video based on the first video data VD1. Similarly, when the second video data VD2, the third video data VD3, and the fourth video data VD4 are respectively distributed to the user terminal device 4, a second video corresponding to a filmed result obtained by filming the second round, a third video corresponding to a filmed result obtained by filming the semi-final, and a fourth video corresponding to a filmed result obtained by filming the final are respectively displayed on the user terminal device 4 as filmed video based on the data.

Furthermore, these first to fourth videos are all displayed through the video screen 50, but any video screen 50 includes various types of options, such as the amount increase option 54 or the like. Therefore, the amount increase option 54 or the amount decrease option 55 may even be selected on the video screen 50 corresponding to any of these filmed videos. The results of an increase or the like according to the amount increase option 54 or the like may be managed as appropriate; for example, the results may be managed for each filmed video or managed collectively as one increase, but in either case, the results are associated with the same competition and managed as prize money for that competition. That is, even if the amount increase option 54 or the amount decrease option 55 is selected on the video screen 50 corresponding to any of the filmed videos from the first video to the fourth video, all results are reflected in the prize money amount set for the same competition. For example, even if the amount increase option 54 is selected in any of separate filmed videos of the first video to the fourth video based on separate video data VD of the first video data VD1 to the fourth video data VD4, the prize money amount of the prize money data AD for the same competition is increased. The same applies when the amount decrease option 55 is selected.

Figure 6:
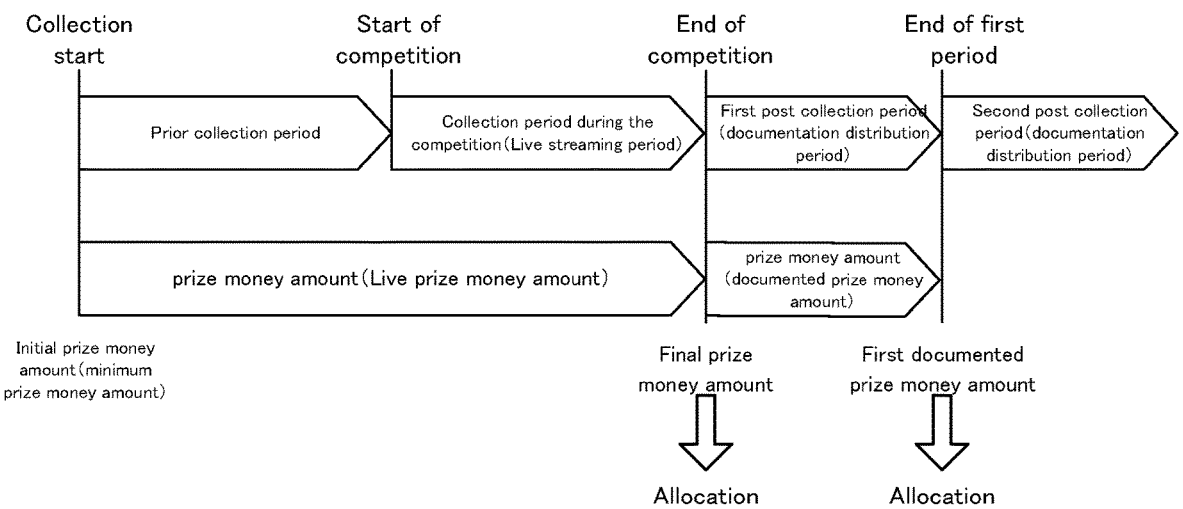
FIG. 6 is a descriptive diagram for describing the relationship between a collection period for prize money and confirmation of the prize money amount.

FIG. 6 is a descriptive diagram for describing the relationship between a collection period for prize money and confirmation of the prize money amount. As one example, while viewing (during distribution of) live video as described above, the collection of prize money (collection of increases in the prize money amount) is executed, but the collection of prize money may or may not be limited to during the viewing (during a competition). That is, the collection of prize money may be set at an appropriate time during the competition and during the period before and after the competition. The example in FIG. 6 illustrates the relationship between the collection period for the prize money and the confirmation of the prize money amount when the prize money is collected during the competition and during the period before and after the competition. In this case, as illustrated in FIG. 6, a prior collection period, a collection period during the competition, a first post collection period, and a second post collection period are formed in the collection period for the prize money. Then, accompanying the end of the competition, the prize money gathered in the prior collection period and the collection period during the competition is confirmed as the final prize money amount and is allocated to a portion of participants P, such as a prize winner in the competition. On the other hand, prize money collected during the first post collection period and the second post collection period is determined as a documented prize money amount at the end of each collection period, and is similarly allocated to a portion of participants P.

Specifically, the prior collection period is first set before the start of the competition (game event). The prize money amount set for the competition at the start of the collection of the prior collection period is the initial prize money amount. The initial prize money amount may be set to zero (in other words, no initial prize money amount) so that all of the prize money amounts are covered by contribution of the sponsors, and as one example, an appropriate minimum prize money amount is set. Furthermore, an increase in the prize money amount during the prior collection period may be realized as appropriate, and may be realized, for example, through an appropriate input procedure by accessing a link prepared on a special website; as one example, the increase is realized through the video screen 50 similar to during the competition. In this case, appropriate footage may be displayed in the video region 51, and as one example, an introduction video for introducing (enlivening) the game event is displayed. Then, the initial prize money amount (minimum prize money amount) is increased or decreased by a touch operation on the amount increase option 54 or the amount decrease option 55 on the video screen 50.

Furthermore, the prior collection period ends accompanying the start of the competition (for example, the start of live streaming), but the collection period during the competition starts therefrom. Collection of prize money in the collection period during the competition is realized through the video screen 50 as described above. Furthermore, the collection period during the competition continues until the end of the competition (for example, the end of live streaming), and the prize money collected in the collection period during the competition (in other words, the live streaming period) is cumulatively added to the initial prize money amount similar to the prize money collected during the prior collection period, and both are managed as a live prize money amount. Then, the live prize money amount, that is, the initial prize money amount and the accumulated amount of prize money (increased amount portion) collected from the start of collection to the end of the competition, is confirmed as the final prize money amount at the end of the competition, and is allocated to a target participant P among the participants P who participated in the game event.

The target participant P may be set as appropriate, and for example, may be only the winner, a prize winner in an appropriate range when a ranking is set between each of the participants P, all the participants P, or participants P defined based on other appropriate target-defining conditions. When the filmed video corresponds to the filmed results of each match in each round, for example, two or more participants P playing a match in a match of the filmed video may be defined as a target-defining condition. Similarly, when there are a plurality of target participants P, the prize money amount to be allocated to these participants P (hereinafter also sometimes referred to as an individual prize money amount) may be determined as appropriate, and as one example, the prize money amount is decided based on an allocation condition. The allocation condition is a condition for allocated the final prize money amount (or various types of prize money amounts thereafter) to the target participant P. The allocation condition may be set as appropriate, and may be, for example, an appropriate rule, such as uniform, inclined, or the like.

Specifically, for example, when allocated to a prize winner within an appropriate range, the prize money amount (or the allocation ratio) is set for each ranking so that the prize money amount increases the higher the ranking, and the prize money amount corresponding to the ranking may be allocated to each participant P as an individual prize money amount. In this case, the allocation ratio (rule) may function as an allocation condition. Similarly, when the prize money is allocated to all the participants P, an inclined allocation (for example, allocated to prize winners at a ratio corresponding to ranking, and a minimum amount is allocated to the other participants P uniformly, or the like) may be realized according to an allocation ratio based on an appropriate condition such as ranking or the like, or a uniform allocation may be realized. In this case, the uniform allocated or inclined allocated including an allocation according to an allocation ratio may function as the allocation condition. Similarly, when the prize money (increased amount portion or contribution amount) collected for each filmed video is managed and the prize money is allocated to two or more participants P corresponding to a match of the filmed video, the prize money may also be allocated according to an appropriate allocation condition, such as uniform, or inclined where for example, there are more winners than losers. Moreover, these allocation may be executed based on an amount where a predetermined fee or the like is subtracted from the final prize money amount.

On the other hand, the collection period during the competition ends accompanying the end of the competition, but the post collection period starts thereafter. The post collection period may start, as appropriate, after the end of the competition, and may start, for example, immediately after the end of the competition by collecting, as appropriate, prize money through, for example, a special website (may be the same as that used in the prior collection period, and may be different), and as one example, the post collection period starts together with the start of distribution of documented video corresponding to documentation of live video (may be video obtained by adding amendments to the live video as appropriate). The post collection period may be set as one period that ends accompanying the passage of a predetermined period, or may be set as a plurality of periods divided by periods as appropriate. Furthermore, when the post collection period includes a plurality of periods, an appropriate number of periods may be set as such a plurality of periods, and in the example in FIG. 6, two periods are illustrated; a first post collection period and a second post collection period.

The first post collection period is a post collection period (documentation distribution period) that begins, for example, together with the start of distribution of documented video after the end of the competition. Even during the first post collection period, collection of prize money may be realized as appropriate, and as one example, collection is realized through the video screen 50 that displays the documented video. Furthermore, since the live prize money amount (prize money accumulated by the end of the competition) is already allocated (confirmed) as the final prize money amount together with the end of the competition, the prize money amount is accumulated (increased) from zero again as the documented prize money amount in the first post collection period. Also, the documented prize money amount is confirmed as the first documented prize money amount at the end of the first post collection period (at the end of the first period of the post collection period) and allocated. The same also applies to the second post collection period (or when the post collection period is set thereafter). In this manner, the collection period for prize money is set not only during and before the competition but also after the competition. Furthermore, in the collection periods during the competition and before the competition, prize money amounts are accumulated so as to span both periods, and the accumulated prize money amounts are allocated once at the end of the competition, but in the collection periods after the competition, the prize money amounts are collected based on the documented video, and the accumulated amounts of prize money collected in each period are allocated for each appropriate period. As one example, a relationship is formed between the collection period of prize money and confirmation of the prize money amount. In this example, the collection period during the competition, the first post collection period, and the second post collection function as predetermined periods according to the present invention. Furthermore, of these, the collection period during the competition functions as the holding period of the event according to the present invention, and the first post collection period and the second post collection period function each function as periods following the end according to the present invention.

Figure 7:
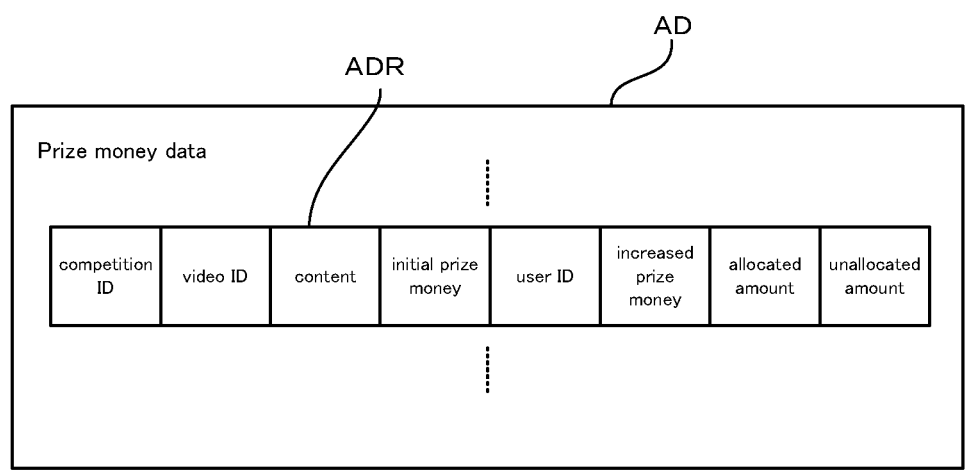
FIG. 7 is a diagram illustrating one example of a configuration of prize money data.

Next, the details of the prize money data AD and the competition data ED will be described below. FIG. 7 is a diagram illustrating one example of a configuration of the prize money data AD. The prize money amount increased (contributed) by each viewer may be managed as an accumulated amount contributed by all viewers without being managed individually, but the example in FIG. 7 illustrates the prize money data AD when the increased amount portion from each viewer is managed individually. Furthermore, the example in FIG. 7 illustrates when the prize money amount of a plurality of competitions (events) is managed by the prize money data AD. In this case, as illustrated in FIG. 7, the prize money data AD includes a prize money record ADR for managing the prize money amounts for each competition (event). Furthermore, to realize the management, the prize money record ADR includes, for example, information such as a "competition ID", "video ID", "content", "initial prize money", "user ID", "increased prize money", "allocated amount", and "unallocated amount".

The "competition ID" is information indicating a unique competition ID for each competition for identifying each competition of a plurality of competitions (events). The "image ID" is information indicating a unique video ID for each filmed video for identifying each filmed video when there are a plurality of filmed videos for a single competition. The "content" is information indicating the content of the filmed video. The information may include appropriate information indicating the content of the filmed video, but when, for example, prize money is allocated to an opponent for each match, information indicating the match is included. The "initial prize money" is information indicating an initial prize money amount (minimum prize money amount) set for each competition. The "user ID" is information indicating a unique user ID for each viewer for identifying each viewer (user viewing the filmed video). The "increased prize money" is information indicating the prize money amount of an increased portion that is increased from the initial prize money amount. In the "increased prize money", information indicating the accumulated amount from all viewers without distinguishing each viewer may be described as the prize money amount of the increased portion, and in the example in FIG. 7, information indicating the individual increased amount portions of each viewer is described.

The "allocated amount" is information indicating the prize money amount already allocated to the target participant P as the increased portion. On the other hand, the "unallocated amount" is information indicating an unallocated prize money amount that has not been allocated yet. In the "allocated amount" and the "unallocated amount", an amount including the initial prize money amount may be described, and in this case, information indicating the accumulated amount from all viewers without distinguishing each viewer may be described; as one example, information on an allocated prize money amount and an unallocated prize money amount from among individual increased amount portions from each viewer is respectively described. The prize money record ADR is recorded so that these pieces of information are mutually associated. In this example, the allocated prize money amount and the unallocated prize money amount respectively function as an awarded prize money amount and an unawarded prize money amount according to the present invention. Furthermore, the "initial prize money", the "increased prize money", the "allocated amount", and the "unallocated amount" all function as event prize money amounts according to the present invention, and appropriate combinations or portions thereof may function as event prize money amounts according to the present invention.

Incidentally, the prize money data AD are not limited to this information, and appropriate information may be managed in response to a request for various types of prize money management (including allocation). Alternatively, a portion of this information may be omitted as appropriate. For example, collection of prize money may be executed in appropriate units, and for example, when an increase of prize money of each ranking is collected as prize money set for each ranking (an increase through the amount increase option 54 or the like is executed so as to be associated with each ranking by including a designation of a target ranking or the like), the prize money data AD may include information on prize money amounts by ranking as the prize money amounts for each ranking. In this case, the individual prize money amount of the participant P corresponding to each ranking may be decided according to the prize money amount by ranking. On the other hand, when, for example, the increased amount portion for each viewer is not managed individually, the information on the "user ID" may be omitted. In this case, for example, information indicating the accumulated amount for all viewers may be described in the "increased prize money". Similarly, when management of the content of the filmed video is not necessary, for example, when the increased prize money amount associated with the filmed video of a match is not allocated to the opponent for each match, the information on the "content" may be omitted.

Figure 8:
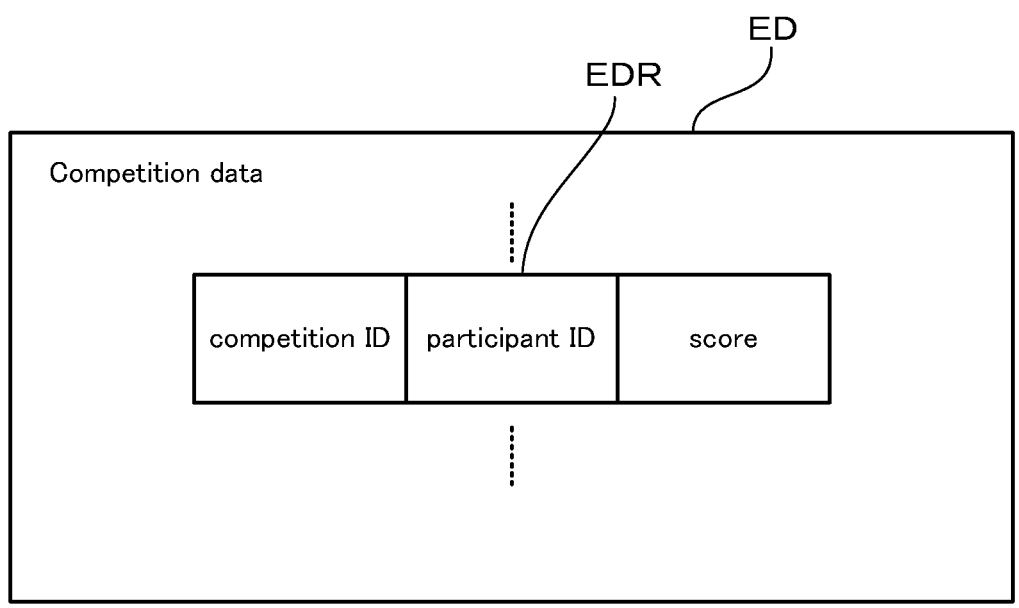
FIG. 8 is a diagram illustrating one example of a configuration of competition data.

FIG. 8 is a diagram illustrating one example of a configuration of the competition data ED. In the competition data ED, information on various types of states in the competition (game event) may be managed as appropriate, and the example in FIG. 8 illustrates when the scores of each participant P are managed. Therefore, the example in FIG. 8 illustrates the competition data ED corresponding to a portion managing the scores of each participant P. Furthermore, the example in FIG. 8 illustrates when the scores of each participant P in a plurality of competitions (events) are managed by the competition data ED. In this case, as illustrated in FIG. 8, the competition data ED includes a competition record EDR that manages the scores of each participant P for each competition (event). Furthermore, to realize the management, the competition record EDR includes, for example, a "competition ID", "participant ID", and "score".

The "competition ID" is information indicating the foregoing competition ID. The "participant ID" is information indicating a unique participant ID for each participant P for identifying each participant P (user of each game machine GM). The participant ID may be a user name for an event or a user number for an event limited to the event. Alternatively, when a user ID (ID identifying each user U without being limited to an event) is used in the play of each game machine GM, the user ID may be used. The "scores" are information indicating the scores of each participant P. Various types of scores in a game event may be included in these scores, but in the case of a tournament-type event in the example in FIG. 5, for example, information for identifying each round, information for identifying a match in each round, information for indicating the victory or defeat in the match, and information for indicating a ranking are included. The competition record EDR is recorded so that these pieces of information are mutually associated. Furthermore, the competition data ED are not limited to this information, and appropriate information may be managed in response to a request for various types of states that may occur in the competition. Alternatively, a portion of this information may be omitted as appropriate.

Next, prize money increase processing, increase cancellation processing, prize money decision processing, prize money offer processing, and privilege award processing will be described below with reference to FIG. 9 to FIG. 13. Prize money increase processing is processing for increasing the prize money set for the competition according to the contribution of the sponsor. The terminal service management part 25 starts the prize money increase processing of FIG. 9 each time an increase in the prize money is instructed via the user terminal device 4 (for example, an increase in the prize money is instructed through the selection of the amount increase option 54 on the video screen 50), and first acquires the increase result provided from the user terminal device 4 (step S101). An appropriate increase instruction such as an arbitrary amount of money or the like may be input via the user terminal device 4, and as one example, an increase in a fixed amount is realized by a single touch operation with respect to the amount increase option 54. Therefore, the user terminal device 4 may provide, as an increase result, at least one of either the number of increases (number of shares) instructed through a touch operation on the amount increase option 54 or an amount of money obtained by multiplying the fixed amount to that number, and as one example, the terminal service management part 25 acquires the number of increases as the increase result. Furthermore, the video screen 50 may be viewed through an appropriate application such as an application for displaying a website on the user terminal device 4 (software), a dedicated application for viewing the filmed video (hereinafter referred to as an app), or the like, and as one example, the video screen 50 is provided so as to request input of the user ID for viewing the filmed video or selecting the amount increase option 54. The user terminal device 4 similarly provides the user ID of the viewer (viewer who has instructed the number of increases) to the terminal service management part 25 as an increase result.

Next, the terminal service management part 25 updates the prize money data AD so as to reflect the increase result acquired at step S101 (step S102). Specifically, the terminal service management part 25 first multiplies the fixed amount to the number of increases acquired in step S101 and calculates the increased amount of money. Then, the terminal service management part 25 reflects the increased amount of money in the information on the "increased prize money" of the viewer who instructed the increased amount of money. That is, the terminal service management part 25 updates the information on the "increased prize money" of the prize money data AD so as to increase the individual increased amount of money (increased amount) of the viewer to the amount of money having the current increased amount of money added thereto. Also, after the update, the terminal service management part 25 ends the current prize money increase processing. Thus, the contribution (increase of prize money) by the viewer is received so that the viewer who views the filmed video obtained by filming the competition functions as a sponsor and is actually reflected in the prize money of the competition. Furthermore, increases in the prize money are managed individually for each viewer.

The increase cancellation processing is processing for cancelling (decreasing) an increase in the prize money of a competition when the prize money has been increased. The terminal service management part 25 starts the increase cancellation processing of FIG. 10 each time a cancellation of an increase is instructed via the user terminal device 4 (for example, a decrease in the prize money is instructed through the selection of the amount decrease option 55 on the video screen 50), and first acquires the cancellation instruction provided from the user terminal device 4 (step S201). An appropriate cancellation (decrease) instruction such as an arbitrary amount of money or the like may be input via the user terminal device 4, and as one example, a decrease of a fixed amount is realized by a single touch operation with respect to the amount decrease option 55. Therefore, the user terminal device 4 may provide, as a cancellation instruction, at least one of either the number of decreases (number of shares) instructed through a touch operation on the amount decrease option 55, or an amount of money obtained by multiplying the fixed amount to that number, and as one example, the terminal service management part 25 acquires the number of decreases as the cancellation instruction. Furthermore, similar to the case of the amount increase option 54, the video screen 50 is configured so as to request input of the user ID for viewing or selecting the amount decrease option 55. The user terminal device 4 similarly provides the user ID of the viewer (viewer who has instructed the number of decreases) to the terminal service management part 25 as a cancellation instruction.

Next, the terminal service management part 25 discerns whether the cancellation instruction of step S201 satisfies a cancellation condition (step S202). When a viewer who has instructed a decrease increased the prize money amount prior thereto, a decrease of the prize money amount is permitted to the extent of the increased amount portion. In other words, a viewer who has not increased the prize money is not permitted to decrease the prize money amount. Furthermore, a decrease through the amount decrease option 55 is limited to only when viewing the filmed video for which the prize money amount has been increased as described above as one example. That is, a temporal condition is set for decreases of the increased amount portion. Additional appropriate conditions may be adopted as the cancellation condition, and as one example, the cancellation condition is satisfied when the viewer of the cancellation instruction has increased the amount and satisfies the temporal condition (a decrease is instructed during viewing of the filmed video for which the amount has been increased). When the decrease instruction does not satisfy the cancellation condition, that is, when an increase has not been instructed therebefore or the temporal condition is not satisfied despite an increase having been instructed (a decrease is instructed outside of viewing, such as after viewing, of the filmed video for which the amount has been increased), the terminal service management part 25 skips the subsequent processing and ends the current increase cancellation processing. In this case, the terminal service management part 25 may provide information indicating that a decrease is not permitted or the like to the user terminal device 4.

On the other hand, when the decrease instruction satisfies the cancellation condition (an increase was instructed therebefore and the current cancellation instruction also satisfies the temporal condition), the terminal service management part 25 defines the cancellation amount (step S203). Specifically, the terminal service management part 25 multiplies the fixed amount to the number of decreases acquired in step S201 and calculates the decreased amount of money. Then, the terminal service management part 25 defines the decreased amount of money as the current cancellation amount. Next, the terminal service management part 25 updates the prize money data AD so as to reflect the cancellation amount (step S204). Specifically, the terminal service management part 25 reflects the cancellation amount (decreased amount of money) defined in step S203 in the information on the "increased prize money" of the viewer who instructed the decrease. That is, the terminal service management part 25 updates the information on the "increased prize money" of the prize money data AD so as to subtract the individual increased amount of money (increased amount) of the viewer from an amount of money obtained by subtracting the current decreased amount of money therefrom. Also, after the update, the terminal service management part 25 ends the current prize money increase processing. Cancellation (subtraction) of the increased amount portion is thereby realized when the prize money has been increased. Furthermore, the cancellation is limited to during viewing of the filmed video for which the amount was increased.

The prize money decision processing is processing for deciding on prize money to be allocated to the participant P of the competition. The terminal service management part 25 starts the prize money decision processing of FIG. 11 at the end of each predetermined collection period, such as a collection period during the competition or a post collection period, and first acquires the prize money amount at the end of the predetermined collection period (step S301). The acquisition is realized on the basis of information on the "initial amount of money", "increased prize money", "allocated amount", and "unallocated amount" of the prize money data AD. Specifically, the terminal service management part 25 first references the information on the "increased prize money" and "allocated amount" of the prize money data AD at the end of each predetermined collection period, and discerns whether the distributed prize money amount is greater than the total increased prize money amount as the accumulated total of the increased prize money amount of each viewer. When the distributed prize amount is smaller than the total increased prize money amount (for example, when the allocated prize money amount is zero), the live prize money amount is discerned as being unallocated. Therefore, the terminal service management part 25 further references the information on the "initial amount of money", and acquires the sum of the initial prize money amount and the total increased prize money amount as the current prize money amount (live prize money amount).

On the other hand, when the allocated prize amount is larger than the total increased prize money amount, the live prize money amount is discerned as being allocated. Therefore, the terminal service management part 25 further references the "unallocated amount", calculates the total unallocated amount as the accumulated total of the unallocated amount of each viewer, and acquires the total unallocated amount as the current prize money amount (documented prize money amount). Furthermore, the terminal service management part may realize the same discernment according to the collection period. Specifically, for example, the terminal service management part 25 may similarly and respectively acquire, as the current prize money amount, the sum of the initial prize money amount and the total increased prize money amount when at the end of the collection period during the competition, and the total unallocated amount when at the end of the post collection period, such as the first post collection period. Moreover, when the prize money amount by ranking is managed, the terminal service management part 25 similarly acquires the unallocated prize money amount from among the prize money amount by ranking as the current prize money amount.

Next, the terminal service management part 25 acquires the result of the competition (step S302). The result of the competition may be provided, as appropriate, through a manual input or the like by a manager or the like, and in one example, the result is managed by the competition data ED. Therefore, the terminal service management part 25 references the competition data ED to acquire the result of the competition. Furthermore, the terminal service management part 25 may acquire appropriate information as the result of the competition, and as one example, the score of each participant P is acquired. Therefore, the terminal service management part 25 references information on the "scores" of the competition data ED and acquires the scores of each participant P as the result of the competition.

Next, the terminal service management part 25 defines the participant P to whom the prize money amount should be allocated (step S303). The participant P that is the target of allocation may be set, as appropriate, as described above, and the terminal service management part 25 defines the target participant P according to the setting. For example, when the participant P that is the target of allocation is a high-ranking prize winner, the score of each participant P is referenced and the participant P corresponding to the high-ranking prize winner is defined as the participant P that is the target of allocation. Alternatively, when an increased amount portion instructed in the filmed video corresponding to each match is allocated to two or more participants P playing each match, the terminal service management part 25 references the score (more specifically, information on matches included therein) of each participant P and defines two or more participants P playing each match as the participant P that is the target of allocation.

Next, the terminal service management part 25 decides the allocated amount (individual prize money amount) to be allocated to the participant P that is the target of allocation defined in step S303 (step S304). The allocation is realized by allocating the prize money amount acquired in step S301 to the participant P that is the target of allocation defined in step S303. Specifically, for example, when the allocation ratio is set for each winning ranking, the terminal service management part 25 calculates the amount of money corresponding to the ratio of each ranking in the unallocated amount and decides the calculated amount of money as the allocated amount for the participants P corresponding to each ranking. Alternatively, when an increase is instructed for each ranking, the terminal service management part 25 decides on the unallocated prize money amount of the prize money amount by ranking set for each ranking as the individual prize money amount of the participant P corresponding to each ranking. Furthermore, for example, when an increased amount portion instructed in the filmed video corresponding to a match is uniformly allocated to two or more participants P playing each match, the terminal service management part 25 distributes the unallocated amount for each filmed video uniformly to two or more participants P corresponding to the filmed video, and decides on the allocated amount of money as the individual prize money amount for the two or more participants P. Then, after the decision, the terminal service management part 25 ends the current prize money decision processing.

Figure 11:
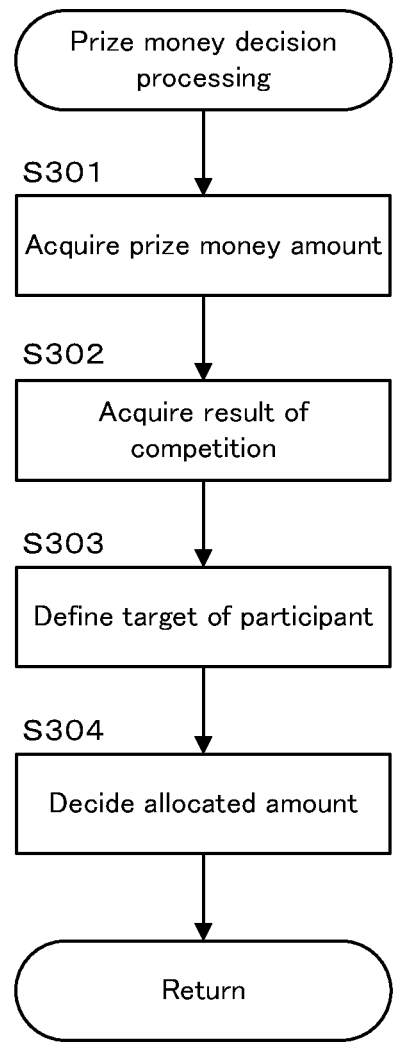
FIG. 11 is a flowchart illustrating one example of a procedure for prize money decision processing.

According to the procedure in FIG. 11, the prize money amount is confirmed for each predetermined collection period, and the allocated amount to be allocated (awarded) to the target participant P as an individual prize money amount is decided based on the prize money amount. Incidentally, the allocated amount decided by the processing may be amended or the like, as appropriate, and confirmed. Furthermore, the actual allocation of the decided allocated amount (or the amended allocated amount) may be realized as appropriate, and for example, when connected to a payment system or the like that realizes payment for each participant P, the allocated amount may be provided to the system and realized up to actual payment.

Figure 12:
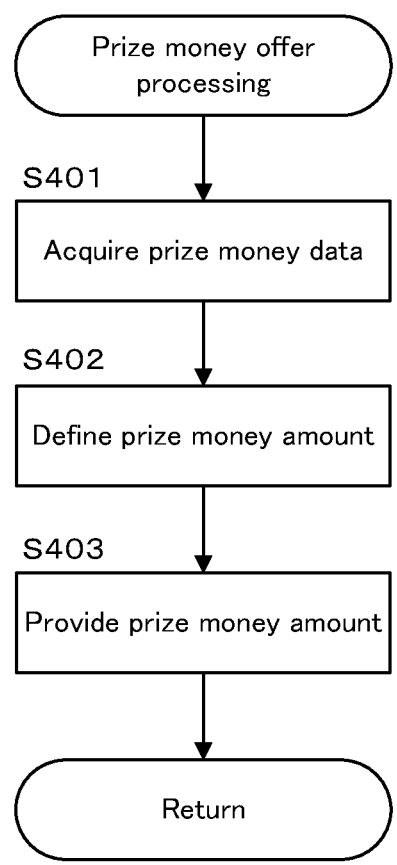
FIG. 12 is a flowchart illustrating one example of a procedure for prize money offer processing.

The prize money offer processing is processing for offering a prize money amount collected during a predetermined collection period. Offering of the prize money amount may be executed as appropriate, and as one example, offering is provided to the viewer through the video screen 50. The example in FIG. 12 illustrates the prize money offer processing when realizing provision through the video screen 50. In this case, the terminal service management part 25 starts the prize money offer processing in FIG. 12 each time an update condition of the prize money offer field 56 in the video screen 50 is satisfied (for example, the update condition is satisfied when display of the video screen 50 starts or when the prize money amount of the competition, that is, an "increased amount" of the prize money data AD, is updated), and first acquires the prize money data AD (step S401).

Next, the terminal service management part 25 references the prize money data AD acquired in step S401 and defines a prize money amount to be offered in the prize money offer field 56 of the video screen 50 (step S402). In the prize money offer field 56, information on the prize money amount may be presented as appropriate, and for example, only information on the sum amount of the initial prize money amount and the total increased prize money amount may be offered, but as one example, the information on the total increased prize money amount and the initial prize money amount information may be separately offered so as to distinguish the two amounts. Therefore, the terminal service management part 25 references the information on the "initial prize money" and the "increased prize money" of the prize money data AD and defines the initial prize money amount and the total increased prize money amount (may also be the increased prize money amount of each viewer) as the prize money amount.

Next, the terminal service management part 25 provides the prize money amount defined in step S402 to the user terminal device 4 (step S403). More specifically, the terminal service management part 25 provides to the user terminal device 4 information on the initial prize amount and the total increased prize money amount so that the sum amount of the total increased prize money amount and the initial prize amount are separately offered in the prize money offer field 56 of the video screen 50. Then, after the provision, the terminal service management part 25 ends the current prize money offer processing. Thereby, the latest prize money amount (sum amount of the total increased prize money amount and initial prize amount) set for the competition of the filmed video displayed on the video screen 50 is provided to the viewer through the prize money offer field 56 of the video screen 50 so as to be distinguished from the initial prize money amount and understood.

Figure 13:
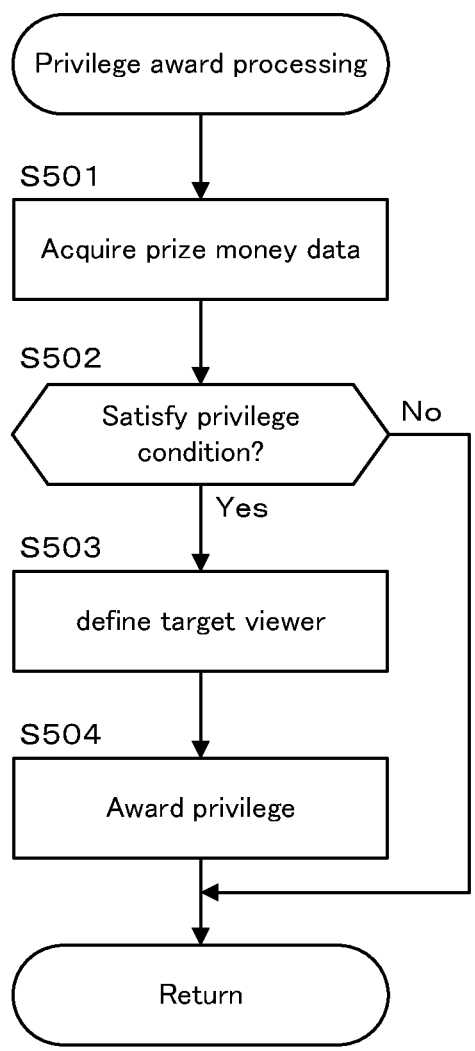
FIG. 13 is a flowchart illustrating one example of a procedure for privilege award processing.

The privilege award processing is processing for awarding a privilege to a viewer (sponsor) who has increased the prize money of the competition. Various types of privileges may be used as the privilege as appropriate, and the example in FIG. 13 is privilege award processing for when the privilege of displaying a sponsor name at the end of a filmed video is awarded. Furthermore, the privilege may be awarded to all viewers who have increased the prize money of the competition in the same manner or while creating an appropriate difference, and as one example, the privilege is awarded uniformly to viewers (sponsors) who satisfy a privilege condition. In this case, the terminal service management part 25 starts the privilege award processing in FIG. 13 each time a predetermined display time (for example, a time when a sponsor name should be displayed) arrives (or may be each time a predetermined privilege award instruction is executed during an edit of the documented video), and first acquires the prize money data AD (step S501).

Next, the terminal service management part 25 discerns whether there is a viewer (sponsor) who satisfies the privilege condition (step S502). An appropriate condition may be used as the privilege condition, and as one example, a condition that is satisfied when the increase is not less than a predetermined amount is adopted. Therefore, the terminal service management part 25 references the information on the "user ID" and the "increased prize money" of the prize money data AD acquired in step S501 (information on the "unallocated amount" in the post collection period) and discerns whether there is a viewer who has performed an increase (contribution) of not less than the predetermined amount. When the privilege condition is not satisfied, in other words, when there is no viewer who has performed an increase (contribution) of not less than the predetermined amount, the terminal service management part 25 skips subsequent processing and ends the current privilege award processing.

On the other hand, when the privilege condition is satisfied, in other words, when there is a viewer who has performed an increase (contribution) of not less than the predetermined amount, the terminal service management part 25 defines the target viewer, in other words, a viewer who satisfies the privilege condition (step S503). Next, the terminal service management part 25 awards the privilege to the target viewer defined in step S503 (step S504). Specifically, the terminal service management part 25 provides information indicating the name of the viewer to the user terminal device 4 so that the name indicating the target viewer defined in step S503 (the name may be an arbitrarily set name, not simply the name of the viewer) is displayed at the end of the filmed video (for example, an end roll portion). Alternatively, in the case of editing the documented video, the terminal service management part 25 edits the video data VD so that the name is added. Then, after awarding the privilege, the terminal service management part 25 ends the current privilege award processing. The privilege is thereby awarded to the viewer who increased the prize money amount by a predetermined amount or more. More specifically, the name of the viewer is displayed as the sponsor name at the end of the filmed video.

As described above, according to the present embodiment, when the amount increase option 54 of the video screen 50 displayed for viewing the filmed video is selected on the user terminal device 4 to which the filmed video obtained by filming the game event is distributed, the prize money amount set for the game event is increased. Then, the individual prize money amount as the prize money to be awarded to the target participant P that is a prize winner or the like of the game event is decided at the end of an appropriate period, such as the collection period during the competition, based on the prize money amount after the increase. That is, the individual prize money amount of the target participant P increases according to the selection (touch operation) of the amount increase option 54 on the user terminal device 4. It is thereby possible to improve the motivation of the participants P in the game event during the game event distributed as the filmed video. In particular, when the game event is held as a competition of a type wherein a plurality of participants P compete for a result, the prize money amount is generally allocated among the prize winners of the competition, but since there is a possibility that any of the participants P will win, it is possible to improve the motivation of all the participants P. As a result, it is possible to contribute to enlivening the entire game event.

Furthermore, generally, the prize money amount of the competition is determined in advance, and although not affected by the content of the competition, the actual content of the competition are unpredictable; in some cases, the viewer (or the spectator PA) may determine that there is value beyond the prize money amount, or may determine that the value is less than the prize money amount. On the other hand, allowing the viewer to function as a sponsor (a contributor to the prize money amount) of the competition makes it possible to provide the prize money amount with a variable prize money portion equivalent to piecework, and it is possible to reflect the content (value) of the competition in the actual prize money amount.

Similarly, various types of events generally provide a higher sense of satisfaction when watched live, but naturally, there may be viewers (or spectators PA) who cannot watch live. On the other hand, when a documented video is distributed after a game event, it is possible to provide an opportunity for the viewers or the like to view the game event. Also, setting a post collection period for this viewing opportunity makes it possible to provide a viewer of the documented video with the opportunity to evaluate the game event through increasing the prize money amount and provide support as a sponsor. Furthermore, the prize money amount of the event is generally confirmed and allocated at the end of the event in many cases, but when the post collection period is set, the prize money amount is increased even after the end of the game event, and the individual prize money amount is decided according to the increased amount portion. Therefore, it is possible to increase the individual prize money amount compared to when the individual prize money amount is confirmed at the end of the event. It is thereby possible to further improve the motivation of the participants P in the game event.

Furthermore, the increase of the prize money amount may be realized in appropriate units, may be increased in units of prize money amount by ranking, or may be increased in units of matches corresponding to the filmed video, but when the increase is made in units of matches, it is possible to allocate the individual prize money amount corresponding to the value of the match to participants P who played in a valuable match. For example, in tournament-format competitions, the most valuable (impressive, moving, or the like) match is often realized in a preliminary match, such as the first round rather than the final, depending on the matching (or development). Through the increase and allocation of units of matches, it is possible to increase the individual prize money amount even for the participant P of the valuable match (filmed video). As a result, the increase may reward more valuable filmed video (match), and it is therefore also possible to enliven the entire game event. Moreover, when a privilege such as the display of a sponsor name is awarded to a viewer who has increased the prize money amount, using the privilege may make it possible to promote an increase of the prize money amount. As a result, it is possible to achieve a synergistic effect of increasing the prize money amount, improving the motivation of the participants, and enlivening the game event.

Figure 9:
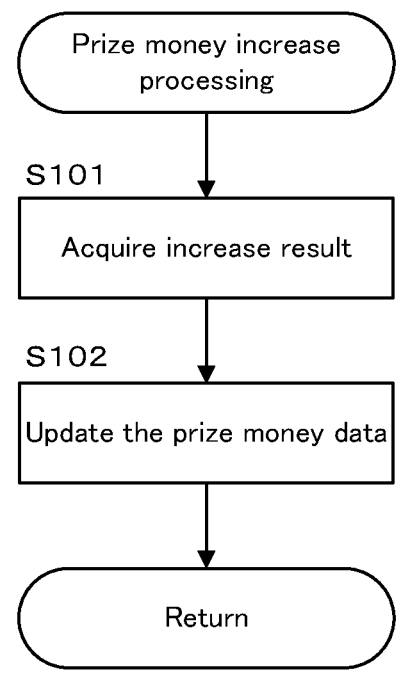
FIG. 9 is a flowchart illustrating one example of a procedure for prize money increase processing.
Figure 10:
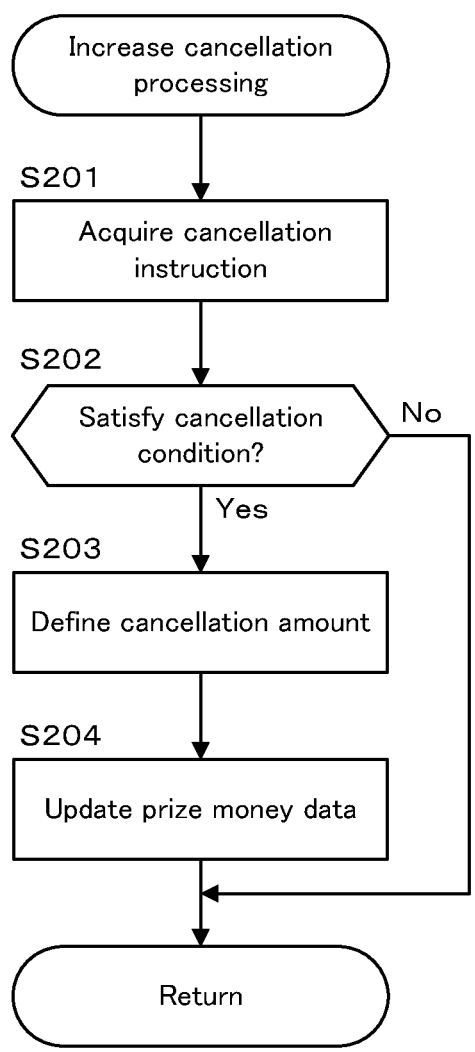
FIG. 10 is a flowchart illustrating one example of a procedure for prize money decrease processing.

In the foregoing embodiment, the terminal service management part 25 of the center server 2 functions as a prize money increase unit according to the present invention by executing the processing of step S102 in FIG. 9. Furthermore, the terminal service management part 25 of the center server 2 functions as a prize money decision unit according to the present invention by executing the processing of step S304 in FIG. 11. Similarly, the terminal service management part 25 of the center server 2 functions as a prize money decrease unit according to the present invention by executing the processing of step S204 in FIG. 10. Furthermore, the terminal service management part 25 of the center server 2 functions as a privilege award unit according to the present invention by executing the processing of step S504 in FIG. 13. Similarly, the terminal service management part 25 of the center server 2 functions as an information provision unit according to the present invention by executing the processing of step S403 in FIG. 12. On the other hand, the storage part 22 of the center server 2 functions as a data storage unit according to the present invention by storing the prize money data AD.

The present invention is not limited to the foregoing embodiment, and may be implemented as an embodiment where appropriate variations or changes have been implemented. For example, in the foregoing embodiment, the filmed video filmed by the camera 3 is distributed to the user terminal device 4 through the footage distribution service. However, the present invention is not limited to this embodiment. The video distribution system 1 may distribute, as appropriate, a video obtained by recording various types of states of a game event (hereinafter also sometimes referred to as a recorded video) through the footage distribution service. The foregoing filmed video is also a video obtained by recording the state of a game event by the camera 3 and can therefore be referred to as one variety of recorded video, but the recorded video additionally includes, for example, the foregoing game screen (including both the game screen corresponding to a capture of the game screen displayed on the game machine GM, and the game screen reproduced based on replay data). That is, the video distribution system 1 may distribute, as appropriate, various types of recorded video including footage configured by the game screen (may include filmed video as appropriate, but may be video that includes only the game screen, or having added various types of audio such as commentary or the like to the game screen) and the foregoing filmed video through the footage distribution service. Also, various types of video-related services including the foregoing sponsor service may be provided with respect to the recorded video. Furthermore, in the foregoing embodiment, the game event is held as an event at the event site EF. However, the event is not limited to a game event. For example, a simple exhibition, such as the showing of a play or the like, may be held at the event site EF as the event, rather than a competition such as a game event.

Furthermore, in the foregoing embodiment, the video distribution system 1 includes the camera 3. However, it is not limited to the embodiment of the present invention. For example, distribution of a live video may be omitted, and distribution of a documented video only may be executed, and in this case, the documented video may be prepared as appropriate. Therefore, in the video distribution system according to the present invention, the camera 3 may be omitted. Similarly, all or a portion of the role (various types of processing or the like) of the center server 2 according to the foregoing embodiment may be executed, as appropriate, by another system (or device) such as the event system, the game machine GM, the user terminal device 4, or the like. That is, the video distribution system according to the present invention may include various types of other systems as appropriate. On the other hand, only the center server 2 may function as the video distribution system according to the present invention, or only another appropriate system such as the event system, the game machine GM, the user terminal device 4, or the like may function as the video distribution system according to the present invention.

Various types of aspects of the present invention derived from the foregoing embodiment and variations, respectively, will be described below. Furthermore, in the description below, the corresponding members illustrated in the attached drawings are added in parentheses to facilitate understanding of each aspect of the present invention; however, the present invention is not limited to the embodiments illustrated thereby.

A video distribution system (1) according to the present invention comprises a computer that is connected via a network (NT) to a user terminal device (4) used by each user and is for distributing to the user terminal device a recorded video as a video obtained by recording state of an event having a plurality of participants (P) participating therein, wherein the computer serves as: a data storage unit (22) that stores prize money data (AD) described so that the recorded video and an event prize money amount as prize money set for the event are associated with each other; a prize money increase unit (25) that increases the event prize money amount according to a donation action executed by each user via the user terminal device so as to be associated with the recorded video; and a prize money decision unit (25) that decides an individual prize money amount as prize money to be awarded to at least a portion of participants of the plurality of participants based on the event prize money amount at the end of a predetermined period.

According to the present invention, when a donation action is executed on a user terminal to which recorded video obtained by filming an event is distributed, an event prize money amount set for the event is increased. Then, the individual prize money amount as the prize money to be awarded to at least a portion of participants of the event at the end of a predetermined period is decided based on the event prize money amount. That is, the individual prize money amount for at least a portion of participants is increased according to a donation action on a user terminal. It is thereby possible to improve the motivation of the participants in the event during the event distributed as the recorded video. In particular, when a competition of a type wherein a plurality of participants compete for a result is held as the event, the event prize money amount is generally allocated among the prize winners of the competition, but since there is a possibility that any of the participants will win, it is possible to improve the motivation of all the participants. As a result, it is possible to contribute to enlivening the entire competition.

The predetermined period may be set during and before and after the event as appropriate. For example, in one aspect of the video distribution system according to the present invention, the prize money decision unit may decide the individual prize money amount based on the event prize money amount at the end of the event when at least holding period of the event is used as the predetermined period. Furthermore, in one aspect of the video distribution system according to the present invention, in the prize money data, when a post-end period after the end of the event is used as the predetermined period, an awarded prize money amount and a non-awarded prize money amount may be described as the event prize money amount so as to distinguish between the awarded prize money amount and the non-awarded prize money amount as the individual prize money amount, the prize money increase unit may increase the unawarded prize amount as the event prize amount in response to the donation action executed after the end of the event, and the prize money decision unit may decide the individual prize money amount based on the unawarded prize money amount at the end of the post-end period. The prize money of the event is generally confirmed and allocated at the end of the event in many cases, but in this case, the event prize money amount is increased even after the end of the event, and the individual prize money amount is decided according to the increased amount portion. Therefore, it is possible to increase the individual prize money amount compared to when the individual prize money amount is confirmed at the end of the event. It is thereby possible to further improve the motivation of the participants.

The increased portion of the event prize money amount based on a donation action may be able to be cancelled, or may not be able to be cancelled. Furthermore, there may be a limitation or no limitation on the cancellation. For example, as one aspect of the video distribution system according to the present invention, the video distribution system may comprise a prize money decrease unit (25) that reduces from the event prize money amount, an increased portion that has increased in accordance with a donation action of a donation user, based on a cancellation action executed via the user terminal device by the donation user as the user who executed the donation action. Furthermore, in this aspect, the prize money decrease unit may limit a decrease of the increased portion based on the donation action executed during viewing of the recorded video, to during viewing of the recorded video wherein the donation action was executed.

Various types of events may be adopted as the event as appropriate. For example, the event may be a competition of a type where results are competed for, and may be an exhibition (for example, a play) of a type where results are not competed for. Furthermore, the recorded video may be configured as a filmed result obtained by filming various types of events as appropriate, and may be, for example, one recorded video or a plurality of recorded videos. Similarly, each recorded video may be constituted by a combination of a plurality of filmed results or may be constituted by only one filmed result. Moreover, these may be edited as appropriate. For example, in one aspect of the video distribution system according to the present invention, the event may be held as a competition wherein the plurality of participants compete for a match result, and includes a plurality of matches as matches between the plurality of participants, the recorded video may include a plurality of recorded videos corresponding to each of the plurality of matches, the event prize amount may be described in the prize money data so as to be associated with the plurality of recorded videos, and the prize money increase unit may increase the event prize money amount according to the donation action executed so as to be associated with any of the plurality of recorded videos.

The increase in the prize money amount may be managed as appropriate. For example, the increase may be managed collectively in event units or managed for each recorded video. Alternatively, in the case of an event where rankings are applied between the participants, an increase may be executed with respect to the rankings, and the prize money amount may be managed for each ranking. In this case, the prize money amount for each ranking may be decided as an individual prize money amount of the participants of each ranking. Specifically, for example, in one aspect of the video distribution system according to the present invention, the event may be held as a competition wherein the plurality of participants compete for a match result so as to decide a ranking between the plurality of participants, the prize money data may be described so that the recorded video and the prize money amount by ranking as a prize money set for each ranking are associated, the prize money increase unit may increase the prize money by ranking corresponding to the ranking associated with the donation action according to the donation action executed so as to be associated with each ranking of the competition, and the prize money decision unit may decide the individual prize money amount of a participant corresponding to each ranking according to the prize money amount by ranking so that the participant corresponding to each ranking of the competition functions as the portion of participants.

Similarly, for example, in an aspect where a competition is held as an event, a match prize money amount set individually for each recorded video of the plurality of recorded videos may be described in the prize money data so as to be associated with each recorded video as the event prize money amount, the prize money increase unit may increase the match prize money amount of a recorded video associated with the donation action in accordance with the donation action, and the prize money decision unit may decide the individual prize money amount to be awarded to each participant of two or more participants (P) in accordance with the match prize money amount of each recorded video so that the two or more participants competing in each recorded video function as the portion of participants. For example, in tournament-format competitions, the most valuable (impressive, moving, or the like) match is often realized in a preliminary match, such as the first round rather than the final; however, in this aspect, it is possible to award the prize money to participants of the valuable match (recorded video). As a result, valuable event content may be rewarded, and it is therefore possible to enliven the entire game event.

An appropriate privilege may be granted to a user who executed a donation action (Furthermore, the privilege may not be awarded because the increase in the prize money can be regarded as consideration for viewing the recorded video). For example, the addition of various types of performances in an event or a recorded video may be used as the privilege. Alternatively, a naming right for naming the name of an event, the right to display a name indicating the user who executed a donation action in the recorded video, or the like may be awarded as appropriate as a privilege. Specifically, for example, as one aspect of the video distribution system of the present invention, the video distribution system may comprise a privilege award unit (25) that grants a privilege related to the event to a donation user as a user who executed the donation action. Furthermore, in this aspect, the privilege award unit may provide information on a name to the user terminal device so that the name set by the donation user is added to the recorded video as the privilege. In these cases, the privilege may be used to promote donation actions.

The event prize money amount may not be provided to the user viewing the recorded video via the user terminal, or may be provided as appropriate. For example, as one aspect of the video distribution system according to the present invention, the video distribution system may comprise an information provision unit (25) that provides information on an event prize money amount to the user terminal device so that information on the event prize money amount is added to the recorded video. Furthermore, in this aspect, an initial prize money amount initially set for the event and an increased prize money amount of a portion increased from the initial prize money amount accompanied by the donation action may be described in the prize money data so as to be associated with the recorded video as the event prize money amount, and the information provision unit may provide information on the initial prize money amount and the increased prize money amount to the user terminal device so that the initial prize money amount and the increased prize money amount are displayed separately as information on the event prize money amount.

On the other hand, a non-transitory computer readable storage medium storing a computer program according to the present invention is configured to cause a computer (21) connected via the network to the user terminal device to function as each unit of the foregoing video distribution system.

Furthermore, a control method according to the present invention is a method for causing a computer (21) which is incorporated into a video distribution system (1) connected via a network (NT) to a user terminal device (4) used by each user, distributing to the user terminal device a recorded video as a video wherein state of an event having a plurality of participants (P) is recorded, and comprising a data storage unit (22) that stores prize money data (AD) described so that the recorded video and an event prize money amount as prize money set for the event are associated with each other, wherein the method for causing the computer comprises: a prize money increase step that increases the event prize money amount according to a donation action executed by each user via the user terminal device so as to be associated with the recorded video; and a prize money decision step that decides an individual prize money amount as prize money to be awarded to at least a portion of participants of the plurality of participants based on the event prize money amount at the end of a predetermined period. Executing the computer program or control method enables the realization of the video distribution system according to the present invention.

The invention claimed is:

1. A video distribution system comprising a computer that is connected via a network to a user terminal device used by each user and is for distributing to the user terminal device a recorded video as a video obtained by recording state of an event having a plurality of participants participating therein, wherein the computer serves as:
a data storage unit that stores prize money data described so that the recorded video and an event prize money amount as prize money set for the event are associated with each other;
a prize money increase unit that increases the event prize money amount according to a donation action executed by each user via the user terminal device so as to be associated with the recorded video; and
a prize money decision unit that decides an individual prize money amount as prize money to be awarded to at least a portion of participants of the plurality of participants based on the event prize money amount at the end of a predetermined period.

2. The video distribution system according to claim 1, wherein the prize money decision unit decides the individual prize money amount based on the event prize money amount at the end of the event when at least holding period of the event is used as the predetermined period.

3. The video distribution system according to claim 2, wherein, in the prize money data, when a post-end period after the end of the event is used as the predetermined period, an awarded prize money amount and a non-awarded prize money amount are described as the event prize money amount so as to distinguish between the awarded prize money amount and the non-awarded prize money amount as the individual prize money amount,
the prize money increase unit increases the unawarded prize amount as the event prize amount in response to the donation action executed after the end of the event, and
the prize money decision unit decides the individual prize money amount based on the unawarded prize money amount at the end of the post-end period.

4. The video distribution system according to claim 1, comprising a prize money decrease unit that reduces from the event prize money amount, an increased portion that has increased in accordance with a donation action of a donation user, based on a cancellation action executed via the user terminal device by the donation user as the user who executed the donation action.

5. The video distribution system according to claim 4, wherein the prize money decrease unit limits a decrease of the increased portion based on the donation action executed during viewing of the recorded video, to during viewing of the recorded video wherein the donation action was executed.

6. The video distribution system according to claim 1, wherein the event is held as a competition wherein the plurality of participants compete for a match result so as to decide a ranking between the plurality of participants,
the prize money data is described so that the recorded video and the prize money amount by ranking as a prize money set for each ranking are associated,
the prize money increase unit increases the prize money by ranking corresponding to the ranking associated with the donation action according to the donation action executed so as to be associated with each ranking of the competition, and the prize money decision unit decides the individual prize money amount of a participant corresponding to each ranking according to the prize money amount by ranking so that the participant corresponding to each ranking of the competition functions as the portion of participants.

7. The video distribution system according to claim 1, wherein the event is held as a competition wherein the plurality of participants compete for a match result, and includes a plurality of matches as matches between the plurality of participants, the recorded video includes a plurality of recorded videos corresponding to each of the plurality of matches, the event prize amount is described in the prize money data so as to be associated with the plurality of recorded videos, and the prize money increase unit increases the event prize money amount according to the donation action executed so as to be associated with any of the plurality of recorded videos.

8. The video distribution system according to claim 7, wherein a match prize money amount set individually for each recorded video of the plurality of recorded videos is described in the prize money data so as to be associated with each recorded video as the event prize money amount, the prize money increase unit increases the match prize money amount of a recorded video associated with the donation action in accordance with the donation action, and the prize money decision unit decides the individual prize money amount to be awarded to each participant of two or more participants in accordance with the match prize money amount of each recorded video so that the two or more participants competing in each recorded video function as the portion of participants.

9. The video distribution system according to claim 1, comprising a privilege award unit that grants a privilege related to the event to a donation user as a user who executed the donation action.

10. The video distribution system according to claim 9, wherein the privilege award unit provides information on a name to the user terminal device so that the name set by the donation user is added to the recorded video as the privilege.

11. The video distribution system according to claim 1, comprising an information provision unit that provides information on an event prize money amount to the user terminal device so that information on the event prize money amount is added to the recorded video.

12. The video distribution system according to claim 11, wherein an initial prize money amount initially set for the event and an increased prize money amount of a portion increased from the initial prize money amount accompanied by the donation action are described in the prize money data so as to be associated with the recorded video as the event prize money amount, and the information provision unit provides information on the initial prize money amount and the increased prize money amount to the user terminal device so that the initial prize money amount and the increased prize money amount are displayed separately as information on the event prize money amount.

13. A non-transitory computer readable storage medium storing a computer program that is configured to cause a computer connected via the network to the user terminal device to function as each unit of the video distribution system according to claim 1.

14. A control method for causing a computer which is incorporated into a video distribution system connected via a network to a user terminal device used by each user, distributing to the user terminal device a recorded video as a video wherein state of an event having a plurality of participants is recorded, and comprising a data storage unit that stores prize money data described so that the recorded video and an event prize money amount as prize money set for the event are associated with each other, wherein the control method for controlling the computer comprises:

a prize money increase step that increases the event prize money amount according to a donation action executed by each user via the user terminal device so as to be associated with the recorded video; and a prize money decision step that decides an individual prize money amount as prize money to be awarded to at least a portion of participants of the plurality of participants based on the event prize money amount at the end of a predetermined period.

* * * * *